(12) United States Patent
Ikuta et al.

(10) Patent No.: US 7,163,167 B2
(45) Date of Patent: Jan. 16, 2007

(54) ONE WAY CLUTCH FOR SPINNING REEL

(75) Inventors: Takeshi Ikuta, Sakai (JP); Kei Saito, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/200,070

(22) Filed: Aug. 10, 2005

(65) Prior Publication Data
US 2006/0169814 A1    Aug. 3, 2006

(30) Foreign Application Priority Data
Aug. 27, 2004  (JP) .............................. 2004-249033
Aug. 30, 2004  (JP) .............................. 2004-250354
Nov. 5, 2004   (JP) .............................. 2004-322393

(51) Int. Cl.
*A01K 89/01* (2006.01)

(52) U.S. Cl. ...................... 242/247; 242/295; 242/301

(58) Field of Classification Search ................ 242/247, 242/260, 295, 307, 298, 301
See application file for complete search history.

(56) References Cited

U.S. PATENT DOCUMENTS

| | | | |
|---|---|---|---|
| 3,540,306 A | 11/1970 | Nurmse | |
| 4,300,730 A | 11/1981 | Carlsson et al. | |
| 4,529,142 A | 7/1985 | Yoshikawa | |
| 5,221,057 A * | 6/1993 | Yoshikawa | ................... 242/247 |
| 5,333,811 A * | 8/1994 | Hitomi | ....................... 242/232 |
| 5,350,129 A | 9/1994 | Furomoto et al. | |
| 5,586,734 A * | 12/1996 | Kawabe et al. | ............. 242/247 |

FOREIGN PATENT DOCUMENTS

| | | |
|---|---|---|
| JP | H05-219865 A | 8/1993 |
| JP | 2002-335827 A | 11/2002 |

* cited by examiner

*Primary Examiner*—Emmanuel M Marcelo
(74) *Attorney, Agent, or Firm*—Global IP Counselors, LLP

(57) ABSTRACT

A one way clutch of a spinning reel for suppressing vibrations is arranged on a rotor that is rotatably mounted on a reel unit of the spinning reel and includes a ratchet wheel, a ratchet pawl, an urging member and a vibration absorption member. The ratchet wheel is fixed to the rotor and has ratchet teeth on an inner periphery thereof. The ratchet pawl is pivotally arranged between a mesh position in which the ratchet pawl meshes with the ratchet teeth and a mesh release position in which the ratchet pawl separates from the ratchet teeth. The urging mechanism urges the ratchet pawl at least to a mesh position side. The vibration absorption member is interposed between the ratchet wheel and the rotor. The one way clutch links the rotor and a rotatable tubular member only when the rotor rotates in the line release direction.

12 Claims, 20 Drawing Sheets

ONE WAY CLUTCH FOR SPINNING REEL

CROSS-REFERENCE TO RELATED APPLICATIONS

This application claims priority to Japanese Patent Application Nos. 2004-249033, 2004-250354, and 2004-322393. The entire disclosure of Japanese Patent Application Nos. 2004-249033, 2004-250354, and 2004-322393 are hereby incorporated herein by reference.

BACKGROUND OF THE INVENTION

1. Field of the Invention

The present invention generally relates to a one way clutch. More specifically, the present invention relates to a one way clutch for a spinning reel disposed on a rotor and rotatably mounted on a reel unit of the spinning reel.

2. Background Information

Inexpensive pawl type one way clutches, which have relatively simple mechanisms, are widely employed on rotors of spinning reels. For example, in a spinning reel having a reverse rotation prevention mechanism, which prevents rotation of the rotor in the line release direction, a one way clutch provided between the rotor and the reel unit is employed in the reverse rotation prevention mechanism. (See, for example, Japanese Patent Application Publication No. 2002-335827.) In addition, in a spinning reel having a lever brake mechanism that slows the rotation of the rotor in the line release direction, a one way clutch provided between the rotor and a brake member, which is operated by a brake lever, is employed in the lever brake mechanism. (See, for example, Japanese Patent Application Publication No. H5-219865.)

The one way clutch employed in the reverse rotation prevention mechanism includes a ratchet wheel, a ratchet pawl, an urging mechanism and an on-off mechanism. The ratchet wheel is fixed to the rotor by means of a bolt, for example. The ratchet pawl is pivotally mounted on the reel unit. The urging mechanism urges the ratchet pawl toward the ratchet wheel. The on-off mechanism compulsively positions the ratchet pawl in a mesh release position. A plurality of saw-tooth shaped ratchet teeth are formed on an inner peripheral surface of the ratchet wheel. The ratchet pawl is pivotally arranged on the reel unit between a mesh position in which the ratchet pawl meshes with the ratchet wheel and a mesh release position in which the ratchet pawl separates from the ratchet wheel.

The one way clutch employed in the lever brake mechanism includes a ratchet wheel, a ratchet pawl and an urging mechanism. The ratchet wheel is fixed to the rotor by means of a bolt, for example. The ratchet pawl is pivotally mounted on a brake member rotatably mounted on the reel unit. The urging mechanism urges the ratchet pawl toward the ratchet wheel. A plurality of saw-tooth shaped ratchet teeth are formed on the inner peripheral surface of the ratchet wheel. The ratchet pawl is pivotally arranged on the brake member between a mesh position in which the ratchet pawl meshes with the ratchet wheel and a mesh release position in which the ratchet pawl separates from the ratchet wheel.

With the one way clutch employed in the reverse rotation prevention mechanism, when the rotation of the rotor is reversed in the line release direction, the ratchet pawl will pivot to the mesh position in order to mesh with the ratchet teeth and place the one way clutch in a linked state. Accordingly, the reverse rotation of the rotor is prevented. In addition when the rotor rotates forward in the line winding direction, the ratchet pawl is pressed by the ratchet teeth to permit the rotation of the rotor. With the one way clutch employed in the lever brake mechanism, when the rotation of the rotor is reversed in the line release direction, the ratchet pawl will pivot to the mesh position in order to mesh with the ratchet teeth and place the one way clutch in a linked state. Accordingly, the rotation of the rotor in the line release direction is transmitted to the brake member. In addition, when the rotor rotates forward in the line winding direction, the ratchet pawl is pressed by the ratchet teeth. Accordingly, the rotation of the rotor will no longer be transmitted to the brake member.

Because the ratchet teeth in the aforementioned configurations are formed on the inner peripheral side of the ratchet wheel, the strength of the ratchet teeth is increased. In addition, because the pitch of the ratchet teeth is precise, the mesh position of the ratchet pawl is precisely set. Accordingly, the reverse rotation prevention of the rotor and the braking of the rotor are performed promptly. However, when the ratchet teeth of the ratchet wheel mesh with the ratchet pawl, the rotating ratchet teeth will suddenly strike the stationary ratchet pawl, thereby causing the ratchet wheel to vibrate. The vibrations are directly transmitted to the rotor because the ratchet wheel is directly mounted to the rotor. These vibrations impart an unpleasant sensation to a fisherman and have an adverse impact on the ratchet teeth and the ratchet pawl.

In view of the above, it will be apparent to those skilled in the art from this disclosure that there exists a need for an improved one way type clutch for a spinning reel that suppresses vibrations. This invention addresses this need in the art as well as other needs, which will become apparent to those skilled in the art from this disclosure.

SUMMARY OF THE INVENTION

An object of the present invention is to suppress vibrations that occur when ratchet teeth of a ratchet wheel mesh with a ratchet pawl in a pawl type one way clutch of a spinning reel.

A one way clutch of a spinning reel according to a first aspect of the present invention is a one way clutch that is arranged on a rotor rotatably mounted on a reel unit of a spinning reel including a ring shaped ratchet wheel, a ratchet pawl, an urging member and a vibration absorption member. The ratchet wheel is fixed to the rotor and has a plurality of saw-tooth shaped ratchet teeth formed on an inner peripheral surface of the ratchet wheel. The ratchet pawl is pivotally arranged between a mesh position in which the ratchet pawl meshes with the ratchet teeth and a mesh release position in which the ratchet pawl is separated from the ratchet teeth. The urging member urges the ratchet pawl to at least the mesh position. The vibration absorption member is interposed between the ratchet wheel and the rotor. The rotor and either the reel unit or the reel component are linked only when the rotor rotates in a line-release direction.

With this one way clutch, when the rotor rotates in the line winding direction, the ratchet teeth press the ratchet pawl in the mesh release direction. The rotor and the reel unit or a rotation member is then disengaged. Because of this, the rotation of the rotor is not transmitted to the reel unit or the rotation member. Thus, with a reverse rotation prevention mechanism in which the ratchet pawl is disposed on the reel unit, the rotor rotates in the line winding direction when the handle rotates in the line winding direction. In addition, with a lever brake mechanism in which the ratchet pawl is disposed on a rotation member such as, for example, a brake unit, the lever brake mechanism is placed in a non-operable position even when the brake is operated by the brake lever. On the other hand, when the rotor rotates in the line winding direction, the ratchet pawl, which is urged to the mesh position by means of the urging member, meshes with the ratchet teeth. The rotor and the reel unit or the rotation member are then linked. Accordingly, the rotation is transmitted from the ratchet teeth to the ratchet pawl. Because of this, with a reverse rotation prevention mechanism, the reverse rotation of the rotor will be prohibited. With a lever brake mechanism, a brake operation is possible by means of the brake lever. When the ratchet pawl meshes with the ratchet teeth, the ratchet wheel vibrates due to the ratchet teeth striking the ratchet pawl. However, because a vibration absorption member is disposed between the ratchet wheel and the rotor, vibrations during striking are absorbed and suppressed. Most of the vibrations will no longer be transmitted to the rotor. Because of this, an unpleasant sensation is rarely imparted to a fisherman. In addition, an adverse impact on the ratchet teeth and the ratchet pawl is prevented.

The one way clutch of a spinning reel according to a second aspect of the present invention is the one way clutch according to the first aspect of the present invention, in which the urging mechanism has a bi-directional urging member that urges the ratchet pawl to the mesh release position side when the rotor rotates in the line winding direction, and urges the ratchet pawl to the mesh position side when the rotor reverse rotates in the line release direction. Here, when the rotor rotates in the line winding direction, the ratchet pawl will be urged to the mesh release position side. Thus, even when the rotor rotates in the line release direction, the ratchet pawl will no longer strike the ratchet wheel. The one way clutch will therefore be quieted. In addition, when the rotor rotates in the line release direction, the ratchet pawl will be urged to the mesh position side to reliably mesh with the ratchet teeth. Here, in an internal teeth type of one way clutch in which the ratchet teeth are formed on the inner peripheral surface, because the ratchet pawl is able to be urged in both directions with one urging member, the two functions of rotation transmission and quieting the one way clutch during rotation disengagement is achieved with one urging member.

The one way clutch of a spinning reel according to a third aspect of the present invention is the one way clutch according to the first aspect of the present invention, in which the urging mechanism has a mesh direction urging member that urges the ratchet pawl to the mesh position side regardless of the rotation of the rotor. Here, when the rotor rotates in the line release direction, the ratchet pawl reliably meshes with the ratchet teeth.

The one way clutch of a spinning reel according to a fourth aspect of the present invention is the one way clutch according to the third aspect of the present invention, in which the urging mechanism further has a mesh release direction urging member that urges the ratchet pawl to the mesh release position side with an urging force that is stronger than that of the mesh direction urging member. Here, when the rotor rotates in the line release direction, the ratchet pawl resists the urging force of the mesh direction urging member. The ratchet pawl is urged in the mesh release direction and no longer contacts the ratchet wheel. Thus, the one way clutch is quieted.

The one way clutch of a spinning reel according to a fifth aspect of the present invention is the one way clutch according to any of the first through fourth aspects of the present invention, in which the rotor has a cylindrical portion and a front wall portion that is unitarily formed with an inner peripheral surface of the cylindrical portion, the ratchet wheel is fixed to either the cylindrical portion and the front wall portion, and is disposed across a gap from the other of the cylindrical portion and the front wall portion, and the vibration absorption member is interposed between the ratchet wheel and either the cylindrical portion and the front wall portion. Here, because the vibration absorption member is disposed on a fixing portion of the ratchet wheel, vibrations can be absorbed with the fixing portion, and because the gap is formed between the side surface (or the outer peripheral surface) on which the vibration absorption member of the ratchet wheel is not disposed and the rear surface of the front wall portion (or the inner peripheral surface of the cylindrical portion), vibrations from those portions will not be transmitted to the rotor.

The one way clutch of a spinning reel according to a sixth aspect of the present invention is the one way clutch according to the fifth aspect of the present invention, and further includes a first ring member made of a resilient material that is disposed in a gap to be in contact with both the ratchet wheel and the other of the cylindrical portion and the front wall portion. Because the first ring member made out of a resilient material is also mounted in the other gap, vibrations can be further absorbed.

The one way clutch of a spinning reel according to a seventh aspect of the present invention is the one way clutch according to any of the first through fourth aspects of the present invention, in which the rotor has a cylindrical portion and a front wall portion that is unitarily formed with an inner peripheral surface of the front portion of the cylindrical portion, the ratchet wheel is fixed to either the cylindrical portion and the front wall portion, and the vibration absorption member is interposed between the ratchet wheel and the cylindrical portion and the front wall portion. Here, because the vibration absorption member is mounted on the entire contact portion between the ratchet wheel and the rotor, vibrations can be more reliably absorbed.

The one way clutch of a spinning reel according to an eighth aspect of the present invention is the one way clutch according to any of the first through seventh aspects of the present invention, in which the clutch wheel has an annular groove in the outer peripheral surface thereof whose bottom diameter is smaller than the outer diameter of the ratchet teeth, and further includes a second ring member made of a resilient material that is mounted in the annular groove. Here, because the bottom diameter of the annular groove formed in the outer peripheral surface of the ratchet wheel is smaller than the outer diameter of the ratchet teeth, the second ring member mounted in the annular groove will be exposed in the outermost radial portion of the ratchet teeth. Because of this, when the ratchet pawl meshes, the tip of the ratchet pawl will come into contact with the second ring member. As a result, the impact of the ratchet pawl when it strikes the ratchet teeth will be lessened, and the vibrations during the striking can be further suppressed.

A ninth aspect of the present invention is a spinning reel including a lever brake mechanism and a one way clutch. The lever brake mechanism is configured to brake a brake unit by means of a brake lever. The one way clutch includes a ring shaped ratchet wheel, a ratchet pawl, an urging member and a vibration absorption member. The ratchet wheel is fixed to the rotor and has a plurality of saw-tooth shaped ratchet teeth formed on an inner peripheral surface of the ratchet wheel. The ratchet pawl is coupled to the brake unit. The ratchet pawl is pivotally arranged between a mesh position in which the ratchet pawl meshes with the ratchet teeth and a mesh release position in which the ratchet pawl is separated from the ratchet teeth. The urging member urges the ratchet pawl to at least the mesh position. The vibration absorption member is interposed between the ratchet wheel and the rotor. The one way clutch only transmits rotation of the rotor to the brake unit when the rotor rotates in a line-release direction.

Here, the vibration of a one way clutch that is arranged on the lever brake mechanism is suppressed.

A tenth aspect of the present invention is a spinning reel including a reverse rotation prevention mechanism having a one way clutch. The one way clutch is configured to prohibit reverse rotation of a rotor in a line-release direction. The one way clutch includes a ring shaped ratchet wheel, a ratchet pawl, an urging member and a vibration absorption member. The ratchet wheel is fixed to the rotor and has a plurality of saw-tooth shaped ratchet teeth formed on an inner peripheral surface of the ratchet wheel. The ratchet pawl is disposed on the reel unit. The ratchet pawl is pivotally arranged between a mesh position in which the ratchet pawl meshes with the ratchet teeth and a mesh release position in which the ratchet pawl is separated from the ratchet teeth. The urging member urges the ratchet pawl to at least the mesh position. The vibration absorption member is interposed between the ratchet wheel and the rotor. The rotor and the reel unit are linked only when the rotor rotates in the line-release direction.

Here, the vibration of a one way clutch that is employed in a reverse rotation prevention mechanism is suppressed.

According to the present invention, because a vibration absorption member is disposed between the ratchet wheel and the rotor, vibrations during striking can be absorbed and suppressed, and most of the vibrations will no longer be transmitted to the rotor. Because of this, an unpleasant sensation will rarely be imparted to a fisherman, and there will rarely be an adverse impact on the ratchet teeth and the ratchet pawl.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
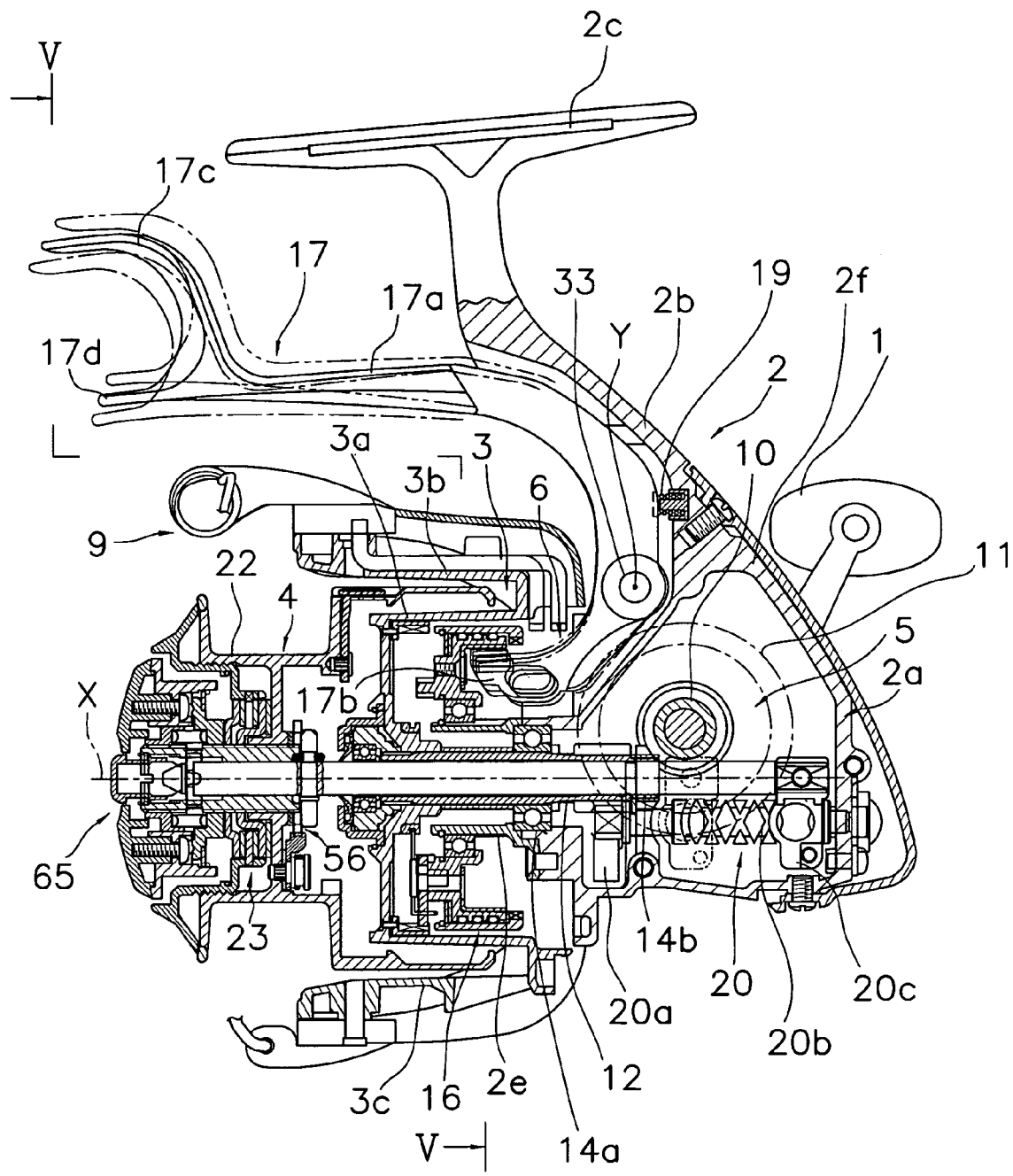
FIG. 1 is a lateral cross section of a spinning reel equipped with a one way clutch in accordance with one embodiment of the present invention.

Referring initially to FIG. 1, a spinning reel is illustrated in accordance with a first embodiment of the present invention. The spinning reel winds fishing line around a first axis X that extends in a longitudinal direction through a fishing rod. The spinning reel includes a reel unit 2, a rotor 3, a spool 4 and a spool shaft 8. The rotor 3 is rotatably supported around the first axis X on a front portion of the reel unit 2. The spool 4 is disposed on a front portion of the rotor 3. The fishing line is wound around the spool 4. The spool 4 rotates about the spool shaft 8. The spool shaft 8 is rotatably supported by the reel unit 2.

Figure 2:
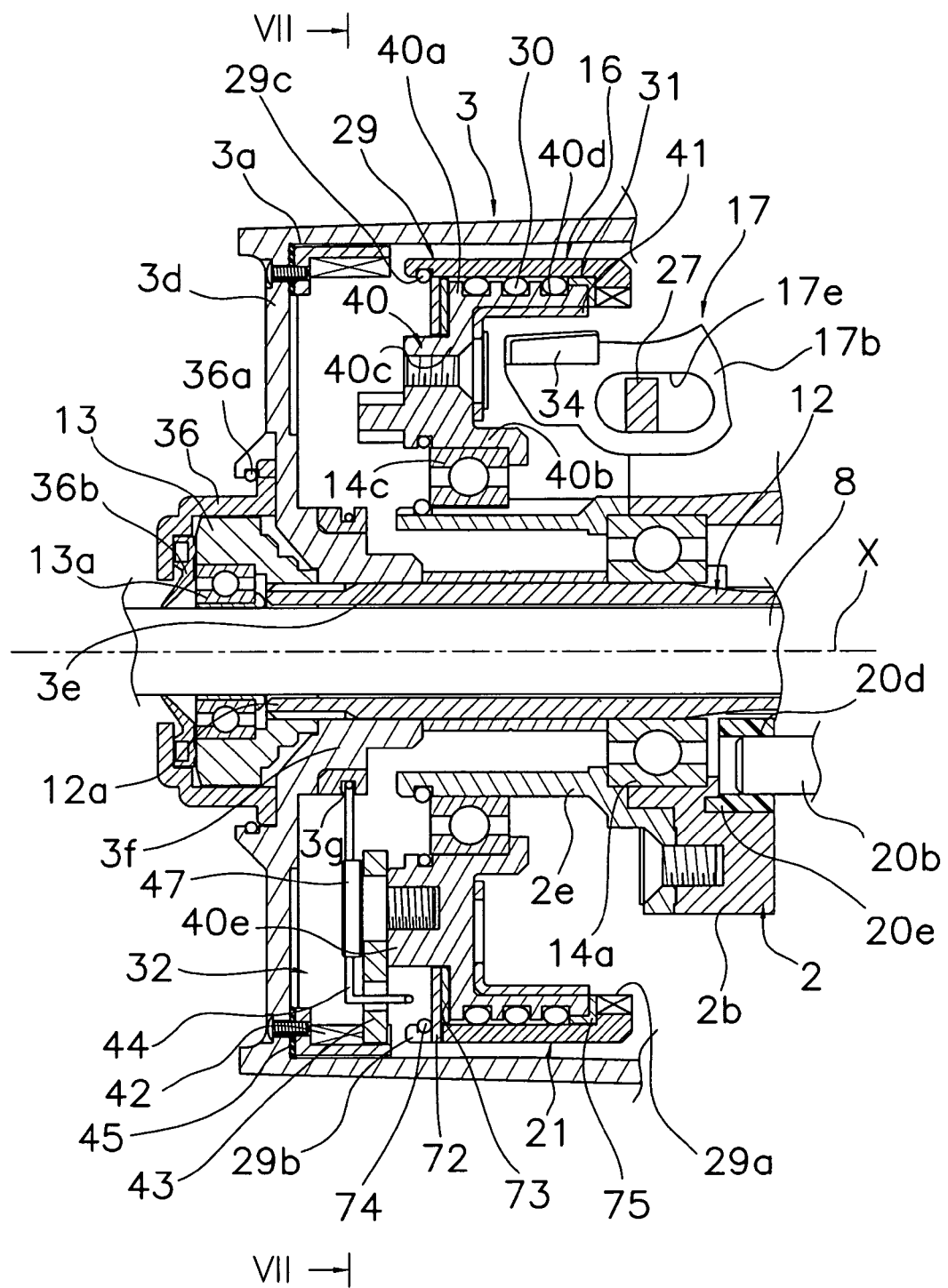
FIG. 2 is an enlarged cross-sectional view of a brake portion of the spinning reel with the one way clutch illustrated in FIG. 1 in accordance with one embodiment of the present invention.
Figure 3:
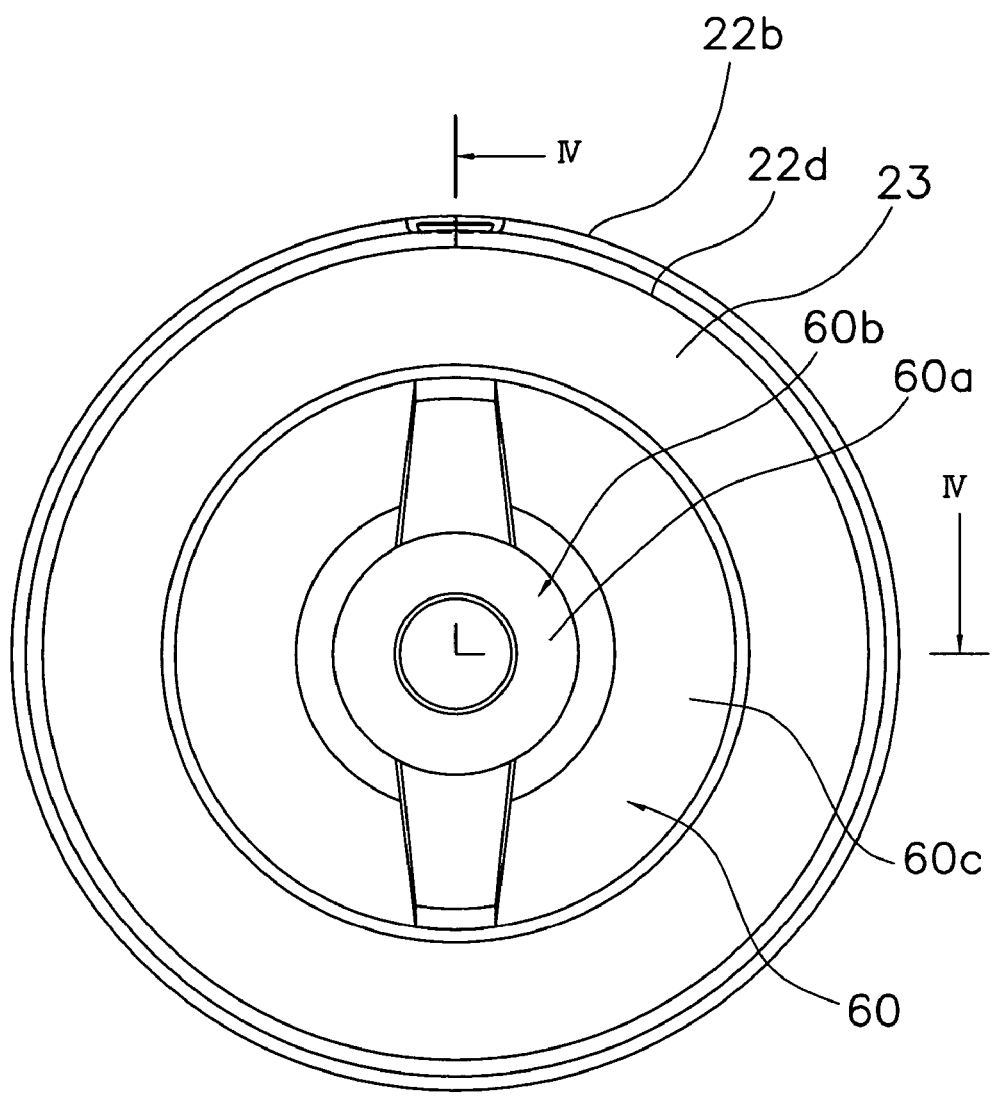
FIG. 3 is a front view of a spool of the spinning reel with the one way clutch illustrated in FIG. 1 in accordance with one embodiment of the present invention.
Figure 5:
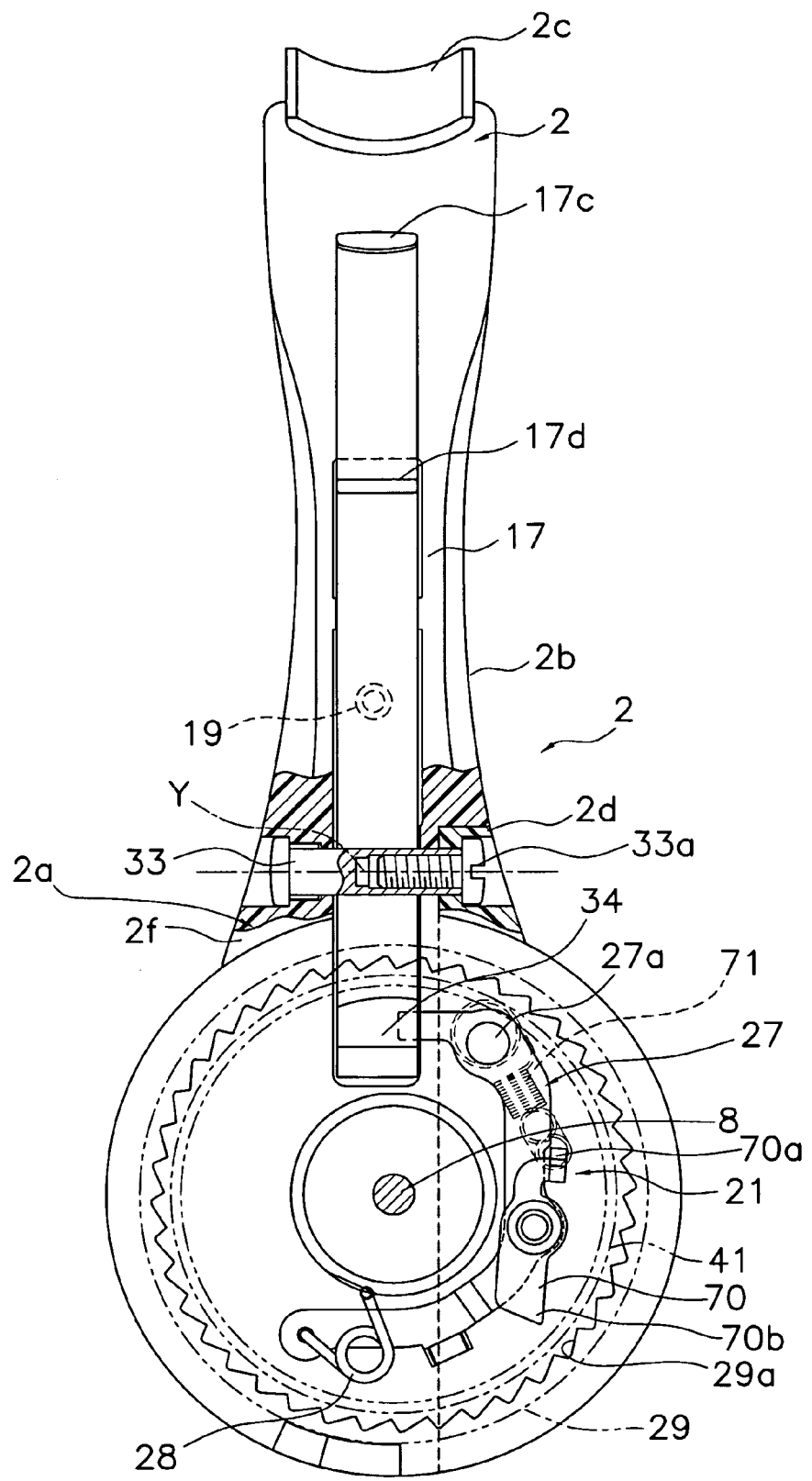
FIG. 5 is a cross-sectional view taken along line V—V of the spinning reel in FIG. 1 in accordance with one embodiment of the present invention.

The reel unit 2 is made, for example, from magnesium or an aluminum alloy. As shown in FIGS. 1 and 5, the reel unit 2 includes a reel body 2a, a leg portion 2b, a mounting portion 2c, a lid member 2d, a tubular installation member 2e and a case portion 2f. The mounting portion 2c extends from front to rear and is mounted to the fishing rod. The reel body 2a is disposed across a gap from the mounting portion 2c. The leg portion 2b links the mounting portion 2c with the reel body 2a. A mechanism mounting space is in an interior of the reel body 2a. The case portion 2f is unitarily formed with the leg portion 2b and an open lateral portion. Referring to FIG. 5, the lid member 2d covers the case portion 2f. Referring to FIG. 2, the tubular installation member 2e includes an installation flange. The tubular installation member 2e is mounted on a front portion of the reel body 2a.

The reel body 2a includes a rotor drive mechanism 5, a lever brake mechanism 6 and an oscillating mechanism 20. The rotor drive mechanism 5, the lever brake mechanism 6 and the oscillating mechanism 20 are provided in the mechanism mounting space of the reel body 2a. The rotor drive mechanism 5 rotates the rotor 3. The lever brake mechanism 6 controls the rotation of the rotor 3 in the line releasing direction (reverse rotation). The oscillating mechanism 20 reciprocally moves the spool 4 forward and backward via the spool shaft 8.

Referring to FIGS. 1 and 2, the rotor 3 is, for example, made of a magnesium alloy or an aluminum alloy. The reel unit 2 rotatably supports the rotor 3. The rotor 3 includes a cylindrical portion 3a, first and second arms 3b and 3c, a front wall 3d, a first through hole 3e, a boss portion 3f and an annular spring mounting groove 3g. The first and second arms 3b and 3c are arranged opposite each other on sides of the cylindrical portion 3a. The boss portion 3f with the first through hole 3e is formed on a central portion of the front wall 3d. The spool shaft 8 and a pinion gear 12 pass through the first through hole 3e. The annular spring mounting groove 3g is formed in an outer peripheral surface of the boss portion 3f. As shown in FIG. 1, a bail arm 9 is pivotally arranged between a tip of the first arm 3b and a tip of the second arm 3c. The bail arm 9 guides the fishing line onto the spool 4.

Figure 4:
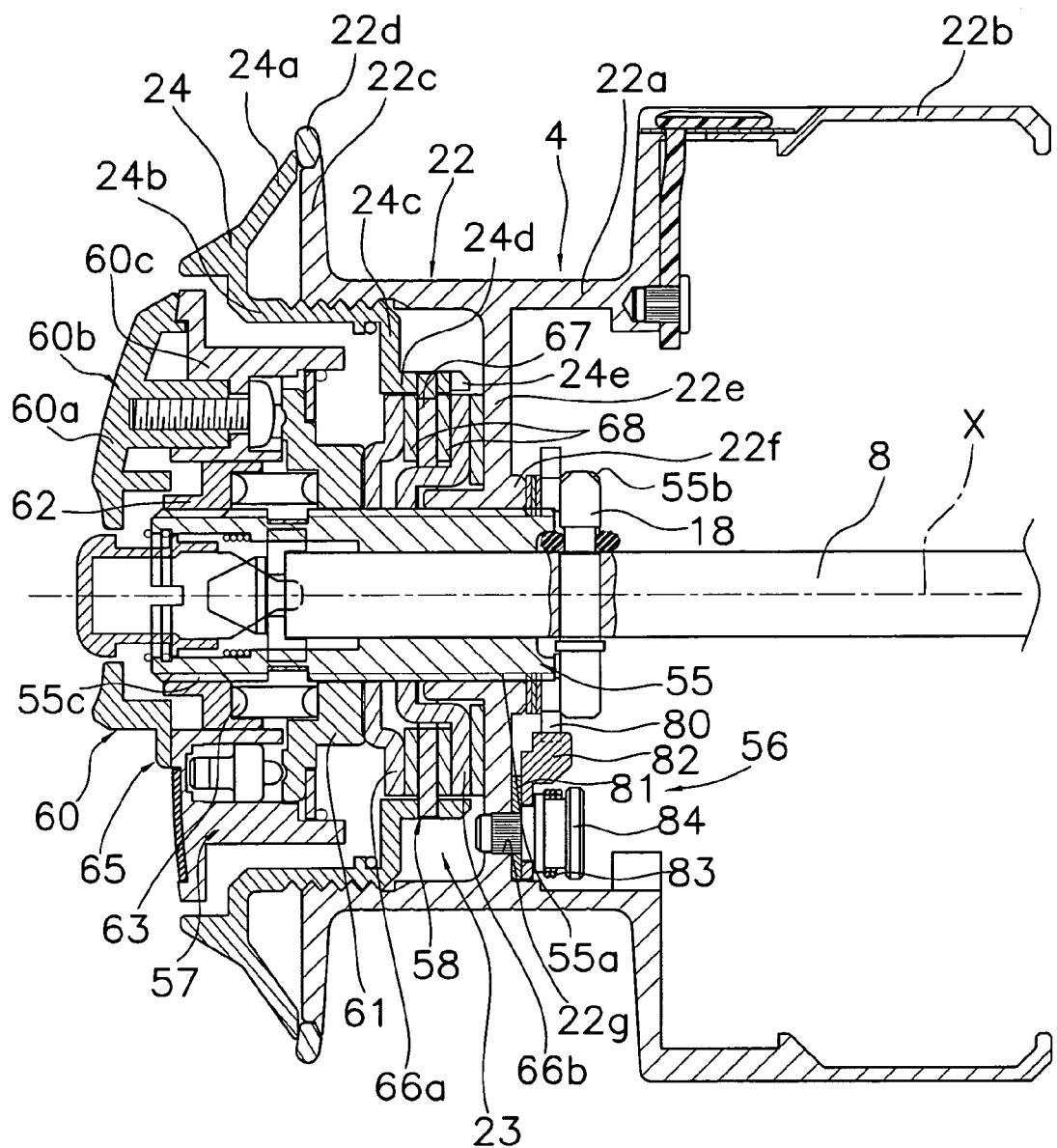
FIG. 4 is a cross-sectional view taken along line IV—IV of the spool illustrated in FIG. 3 in accordance with one embodiment of the present invention.

Referring to FIGS. 1 and 4, the spool 4 is made of, for example, an aluminum alloy. The spool 4 is disposed between the first arm 3b and the second arm 3c of the rotor 3. The spool 4 is removably and non-rotatably mounted on a tip of the spool shaft 8 via a one-touch attachment/removal mechanism 65. The spool 4 includes a spool unit 22 and a drag mechanism 23. The spool unit 22 has a tubular bobbin portion 22a, a tubular skirt portion 22b, a spool flange portion 22c and a hard annular flange protection member 22d. The spool flange portion 22c is formed diagonally forward on a front portion of the bobbin portion 22a. The tubular skirt portion 22b is formed on a rear end portion of the bobbin portion 22a. The tubular skirt portion 22 has a larger diameter than a diameter of the bobbin portion 22a.

The bobbin portion 22a has a mounting disk portion 22e and a mounting tubular portion 22f. The mounting disk portion 22e has a second through hole 22g. The mounting tubular portion 22f is unitarily formed on an inner peripheral side of the mounting disk portion 22e, which extends radially inward.

The hard annular flange protection member 22d is mounted on an outer peripheral surface of the spool flange portion 22c. The flange protection member 22d has a flange fixing member 24. The flange protection member 22d is fixed to the spool flange portion 22c by the flange fixing member 24. The flange fixing member 24 has a tapered pressing portion 24a, a first fixing tubular portion 24b, a fixing disk portion 24c, a second fixing tubular portion 24d and a fixing disk portion 24c. The tapered pressing portion 24a presses the flange protection member 22d. The first fixing tubular portion 24b extends rearward from the pressing portion 24a. The fixing disk portion 24c is formed to project radially inward on the rear portion of the first fixing tubular portion 24b and 24c. The second fixing tubular portion 24d extends rearward from the fixing disk portion 24c. The first fixing tubular portion 24b is threaded onto an inner peripheral surface of the bobbin portion 22a. In addition, the drag mechanism 23 is accommodated in the second fixing tubular portion 24d. The engagement grooves 24e are, for example, formed in two locations on the second fixing tubular portion 24d of the flange fixing member 24. The flange fixing member 24 is both thread onto and adhered to the bobbin portion 22a. In this way, the flange fixing member 24 will not become loose due to torque applied during drag and vibrations.

The spool unit 22 further includes a spool tubular portion 55. The mounting tubular portion 22f is rotatably mounted on the spool tubular portion 55. The spool tubular portion 55 is non-rotatably mounted on the spool shaft 8. The spool tubular portion 55 has a chamfered portion 55a that is mutually parallel and opposite to an outer peripheral surface of an intermediate portion of 55. In addition, a rear end portion of the spool tubular portion 55 has a large diameter. The spool tubular portion 55 includes an engagement groove 55b and a male threaded portion 55c. The engagement groove 55b is formed along the large diameter of the spool tubular portion 55. An engagement pin 18 engages in the engagement groove 55b such that the spool tubular portion 55 is non-rotatably mounted on the spool shaft 8. The engagement pin 18 regulates rearward movement of the spool tubular portion 55. The male threaded portion 55c is for drag adjustment. The male threaded portion 55c is provided on an outer peripheral surface of a front end portion of the spool tubular portion 55.

Still referring to FIG. 4, the drag mechanism 23 of the spool 4 has a drag sound generation mechanism 56, drag adjustment portion 57 and a friction portion 58. The drag adjustment portion 57 adjusts a friction force of the drag mechanism 23. The drag adjustment portion 57 includes an operation member 60 and a pressing member 61. The operation member 60 threads onto the spool tubular portion 55. The pressing member 61 is pressed by the operation member 60 and thereby presses the friction portion 58. The operation member 60 has a knob 60a having a knob projection 60b that projects along the diameter thereof. The operation member 60 further has a knob flange portion 60c that is fixed to the knob 60b projection. A nut 62 that screws onto the male threaded portion 55c of the spool tubular portion 55 is non-rotatably and axially movably mounted on the knob flange portion 60c. A drag coil spring 63 that serves to adjust the drag force is mounted in a compressed state between the nut 62 and the pressing member 61. The pressing member 61 is non-rotatably and axially movably disposed on the spool tubular portion 55. In addition, the pressing member 61 is rotatably and non-detachably connected to the operation member 60. Furthermore, a drag knob sound generation mechanism 64 is mounted between the operation member 60 and the pressing member 61. The 64 generates sound when the operation member 60 is rotated to adjust the drag.

The friction portion 58 is mounted between the pressing member 61 and the mounting disk portion 22e of the spool unit 22. The friction portion 58 has first disks 66a and 66b, a second tabbed disk 67 and a drag disk 68. The first disks 66a and 66b are non-rotatably mounted on the spool tubular portion 55. The second tabbed disk 67 has tab portions and is non-rotatably mounted on the second fixing tubular portion 24d. The drag disk 68 is disposed between the two first disks 66a and 66b and the second disk 67. The flange fixing member further has a plurality of engagement grooves 24e that serve to engage.

The tab portions of the second disk 67 engage the engagement grooves 24e.

As shown in FIG. 1, the rotor drive mechanism 5 has a master gear 11 and a pinion gear 12 that meshes with the master gear 11. The master gear 11 rotates together with a handle shaft 10 to which the handle 1 is fixed. As shown in FIG. 2, the pinion gear 12 is a tubular shape. The pinion gear 12 has a front portion 12a that extends through the first through hole 3e of the rotor 3 to a spool side. The rotor 3 is non-rotatably fixed to the pinion gear 12 by means of a nut 13 at the front portion 12a of the pinion gear 12. The pinion gear 12 is rotatably supported on the reel unit 2 by means of a first bearing 14a at the front portion 12a and a second bearing 14b at a rearward portion of the pinion gear 12. The nut 13 is prevented from being loosened by means of a retainer 36. In addition, the nut 13 is brought into contact with the spool shaft 8 by means of a third bearing 13a. In this way, a gap is formed between an inner peripheral surface of the pinion gear 12 and an outer peripheral surface of the spool shaft 8. The retainer 36 is engaged with the front wall 3d by means of a retaining spring 36a. In addition, a seal member 36b is mounted on the retainer 36 and prevents liquids from entering into the interior of the rotor 3.

As shown in FIG. 1, the oscillating mechanism 20 has an intermediate gear 20a that meshes with the pinion gear 12, a worm shaft 20b and a slider 20c. The oscillating mechanism 20 is of the traverse cam type. The worm shaft 20b is mounted on the reel body 2a so as to rotate parallel with the spool shaft 8. The slider 20c moves forwards and backwards by means of the rotation of the worm shaft 20b. The rear end portion of the spool shaft 8 is non-rotatably and axially non-movably installed on the slider 20c. As shown in FIG. 2, the oscillating mechanism further has a bushing 20d and a projection 20e. The bushing 20d rotatably supports a front end portion of the worm shaft 20b. 20d is prevented from rotating by the projection 20e. The projection 20e projects forward from a forward end surface of the bushing 20d.

As shown in FIGS. 1, 4 and 9–13, the drag sound generation mechanism 56 generates sounds by means of the relative rotation of the spool 4 and the spool shaft 8 during drag operation. The drag sound generation mechanism 56 includes a disk member 80, an engagement member 81, a pawl member 82, a spring member 83 and a pin member 84. The disk member 80 is non-rotatably mounted on an outer peripheral surface of rear portion of the spool tubular portion 55. The engagement member 81 is non-movably fixed with respect to the mounting disk portion 22e of the spool 4. The pawl member 82 is pivotally mounted with respect to the mounting disk portion 22e of the spool 4 to a rear surface of the 22e. The spring member 83 urges the pawl member 82 from a first position (the position shown in FIG. 12) or a second position (the position shown in FIG. 13) to a neutral position (the position shown in FIG. 11). The pin member 84 pivotally mounts the pawl member 82 with respect to the spool 4 and non-movably mounts the engagement portion 81 with respect to the spool 4

The disk member 80 is an annular member made of metal for example. An inner peripheral portion of the disk member 80 is non-rotatably fixed to the spool tubular portion 55. The disk member 80 has a plurality of teeth 80a formed on an outer peripheral portion of the disk member 80. The teeth 80a are spaced apart in the circumferential direction.

The pawl member 82 includes a contact portion 82a. The contact portion 82a contacts the teeth 80a of the disk member 80. When the spool 4 is rotated during a drag operation, the contact portion 82a of the pawl member 82 repeatedly contacts the teeth 80a of the disk member 80 and generates sound.

The pawl member 82 is made of metal, for example. The pawl member 82 is pivotally mounted on the pin member 84. The contact portion 82a has a tip portion that contacts the teeth 80a of the disk member 80. The pawl member further includes a first engagement portion 82b and a third through hole 82c. The first engagement portion 82b is engaged with both end portions of the spring member 83. The third through hole 82c is formed so as to be concentric with the pivot center.

Figure 9:
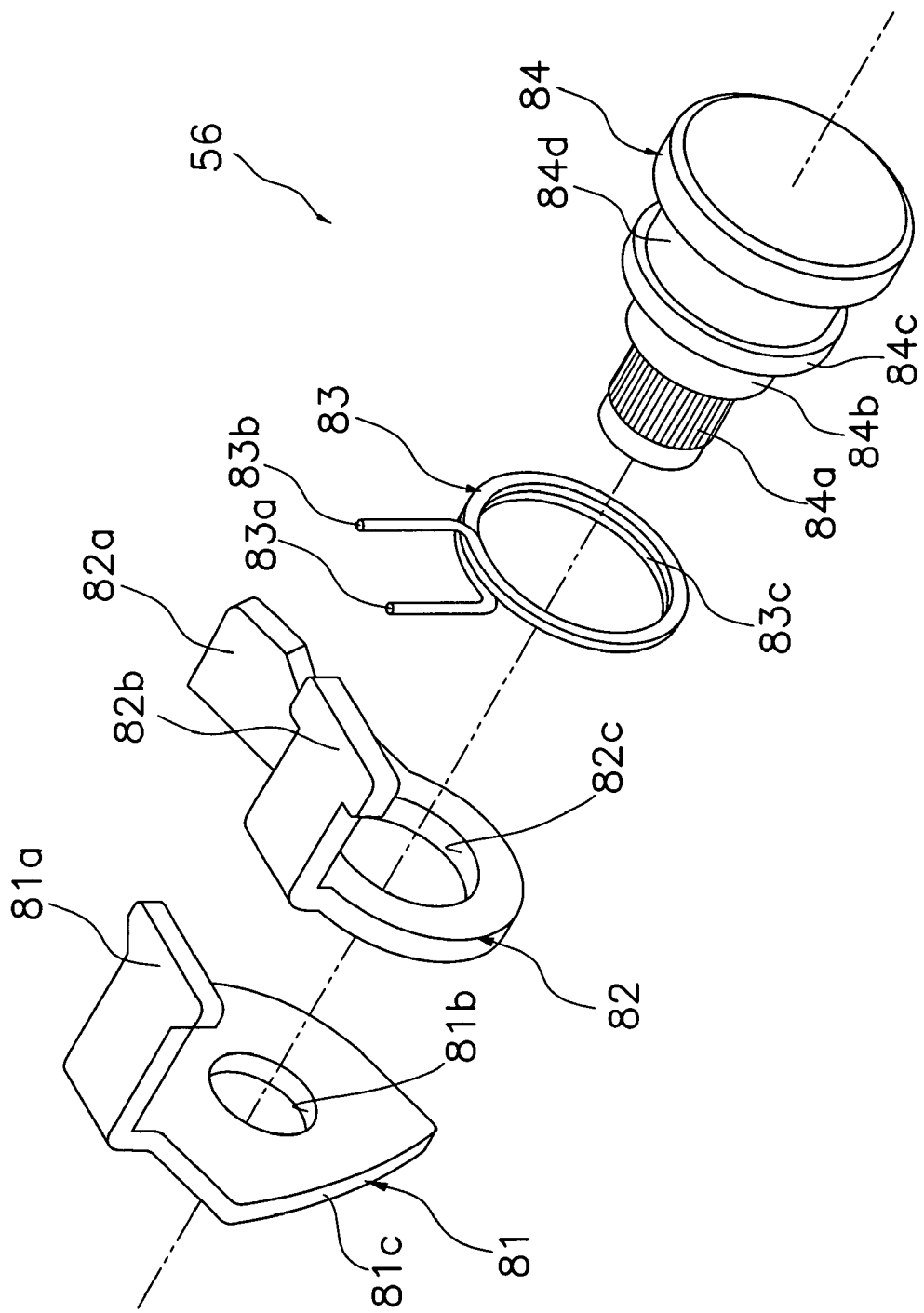
FIG. 9 is an exploded view of a drag sound generation mechanism of the spinning reel illustrated in FIG. 1 in accordance with one embodiment of the present invention.
Figure 11:
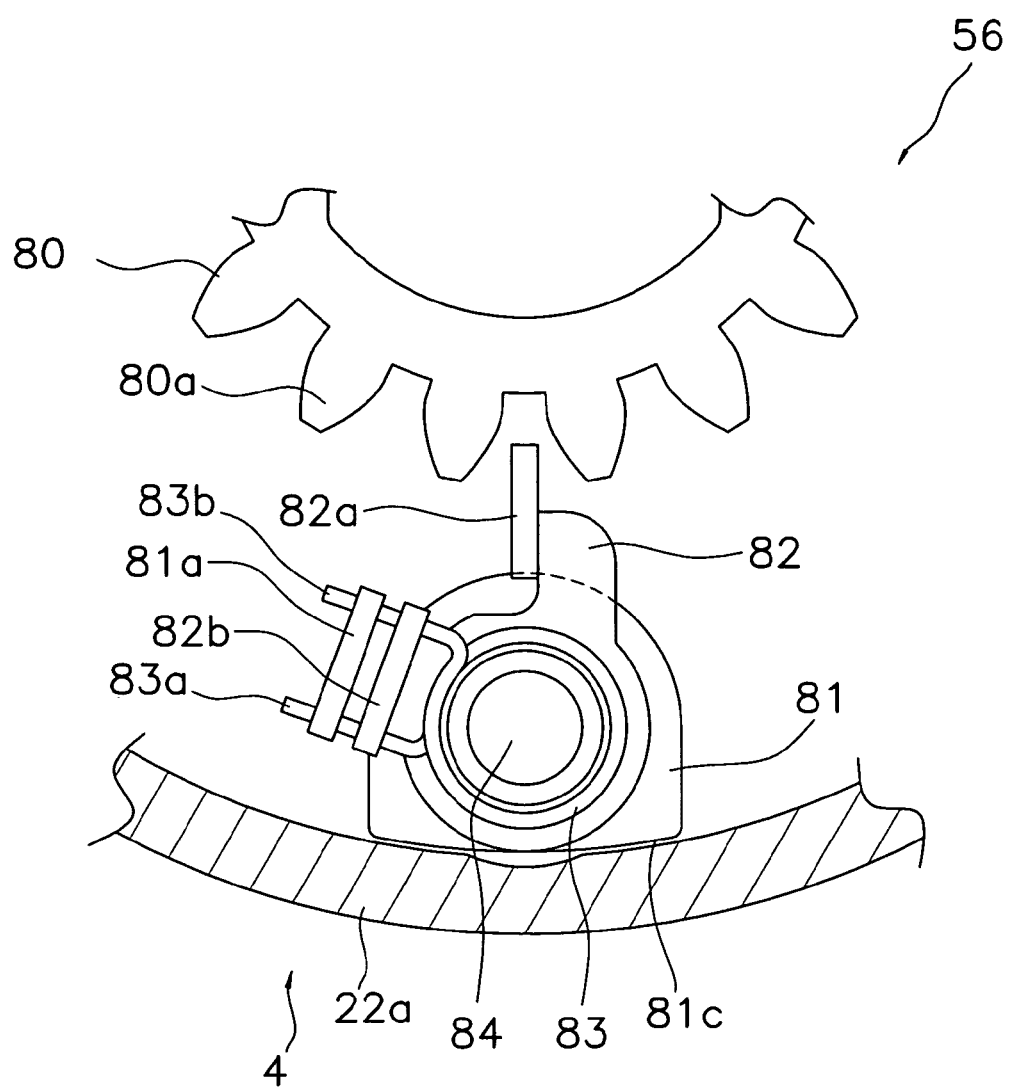
FIG. 11 is a rear view of a pawl member of the drag sound generation mechanism illustrated in FIGS. 9 and 10 in a neutral position in accordance with one embodiment of the present invention.

As shown in FIGS. 9 and 11, the tip portion of the contact portion 82a projects toward the teeth 80a so as to contact the teeth 80a of the disk member 80.

As shown in FIG. 9, the first engagement portion 82b slightly to projects radially outward in a direction that is substantially perpendicular to an acute angle with the contact portion 82a. The 82b further projects axially rearward. The tip portion of the first engagement portion 82b is relatively wider than other portions of the 82b so that the spring member 83 will not fall off in the axially rearward direction. The third through hole 82c has an outer shape that is circular.

As shown in FIG. 9, the spring member 83 is a twisted coil spring made of metal for example. The spring member 83 includes a first arm portion 83a, a second arm portion 83b and a coil portion 83c. The coil portion 83c is wrapped with a plurality of turns. The first arm portion 83a and the second arm portion 83b project radially outward from the coil portion 83c such that both first and second 83a and 83b are mutually parallel. The first arm portion 83a and the second arm portion 83b are disposed in a position in which the first engagement portion 82b of the pawl member 82 and a second engagement portion 81a (described below) of the engagement member 81, are interposed therebetween. When the contact portion 82a is positioned in the neutral position, the first engagement portion 82*b* is engaged so as to be interposed between the first arm portion 83*a* and the second arm portion 83*b*.

As shown in FIGS. 4 and 9–13, the engagement member 81 is a plate shaped member made of metal that is press-fitted onto the mounting disk portion 22*e* of the spool 4 by means of the pin member 84. The engagement member 81 includes a second engagement portion 81*a*, a fourth through hole 81*b* and a positioning portion 81*c*. The second engagement member 81 is engaged with the first arm portion 83*a* and the second arm portion 83*b*. The first engagement portion 82*b* and the second engagement portion 81*a* urge the pawl member 82 pivoted to the first position or the second position back to the neutral position. The second through hole 81*b* communicates with the third through hole 82*c* of the pawl member 82. The positioning portion 81*c* is composed of a tapered surface that has the substantially same diameter as the diameter of the inner peripheral surface of the bobbin portion 22*a* of the spool 4. The engagement member 81 performs positioning and rotation prevention by disposing the positioning portion 81*c* along the inner peripheral surface of the bobbin portion 22.

The second engagement portion 81*a* projects radially outward from a position that is concentric with the first engagement portion 82*b*. The second engagement portion 81*a* also projects axially rearward so as to cover the first engagement portion 82*b*. The second engagement portion 81*a* is formed so that a tip surface thereof is approximately the same as the tip surface of the first engagement portion 82*b*. The second engagement portion 81*a* is slightly longer than the first engagement portion 82*b*. The tip portion of the second engagement portion 81*a* is relatively wider than other portions of the second engagement portion 81*a* so that the spring member 83 will not fall off in an axially rearward direction.

The fourth through hole 81*b* has generally a circular outer shape. The engagement member 81 is non-movable with respect to the pin member 84.

Figure 10:
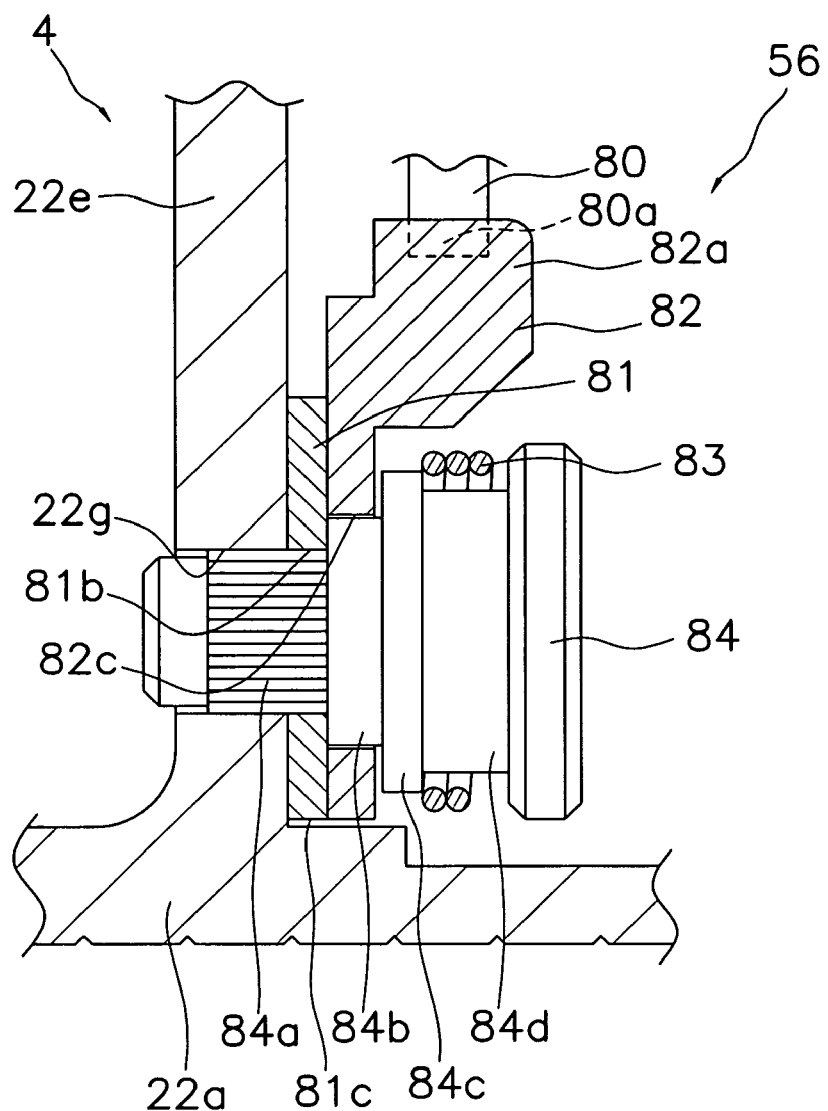
FIG. 10 is an enlarged cross-sectional view of the drag sound generation mechanism illustrated in FIG. 9 in accordance with one embodiment of the present invention.

The pin member 84, as shown in FIGS. 9 and 10, is a bolt shaped member. The pin member 84 is made of a metal comprising a copper alloy such as brass or the like for example. The pin member 84 passes through the third through hole 82*c* and the fourth through hole 81*c*. The pin member 84 is press fitted in the second through hole 22*g* of the spool unit 22. The pin member 84 includes a fixing portion 84*a*, a support portion 84*b*, a head portion 84*c* and a mounting groove 84*d*. The fixing portion 84*a* is formed on a forward side of the pin member 84. The support portion 84*b* has a larger diameter than a diameter of the fixing portion 84*a*. The head portion 84*c* is formed on a rearward side of the 84*b*. The 84*c* has a larger diameter than the diameter of the support portion 84*b*. The mounting groove 84*d* is formed in a groove shape along a circumferential direction in a middle section of the head portion 84*c*.

The fixing portion 84*a* has serrations formed on an outer periphery of the 84*a*. The serrations are composed of a plurality of grooves. The outer diameter of the fixing portion 84*a* has a slightly larger diameter than inner diameters of the fourth through hole 81*b* of the engagement member 81 and the second through hole 22*g* of the spool unit 22. Because of this, the fixing portion 84*a* is press fitted into both the fourth through hole 81*b* and the second though hole 22*g*. Accordingly, the engagement member 81 is non-movably fixed with respect to the mounting disk portion 22*e* of the spool unit 22.

The support portion 84*b* is inserted into the third through hole 82*c* of the pawl member 82 and pivotally supports the pawl member 82. The outer diameter of the support portion 84*b* is slightly smaller than on inner diameter of the third though hole 82*c* of the pawl member 82 to cause the pawl member 82 to be pivotable with respect to the pin member 84.

The diameter of 84*c* is a larger diameter than the third through hole 82*c* of the pawl member 82. Because of this, axially rearward movement of the pawl member 82 will be limited by bringing a rear end surface of the pawl member 82 into contact with a front end surface of the head portion 84*c*.

The mounting groove 84*d* serves to mount and fix the spring member 83. Specifically, the coil portion 83*c* of the spring member 83 is installed in the mounting groove 84*d*. The outer diameter of the mounting groove 84*d* is formed so as to be approximately the same as an inner diameter of the coil portion 83*c*. The coil portion 83*c* is mounted on the 84*d* by spreading the coil portion 83*c* and seating the 83*c* into the mounting groove 84*d*. Here, because the outer diameter of the mounting groove 84*d* is approximately the same as the inner diameter of the coil portion 83, the spring member 83 will be difficult to move with respect to the pin member 84.

In assembling the drag sound generation mechanism 56 on the spool 4, the disk member 80 is first installed on the spool tubular portion 55 that is non-rotatably mounted on the spool shaft 8. Next, the spring member 83 is mounted in the mounting groove 84*d* of the pin member 84. Next, with the first engagement portion 82*b* of the pawl member 82 stacked together with the second engagement portion 81*a* of the pawl member 81, the positioning portion 81*c* of the pawl member 81 is matched with the inner peripheral surface of the bobbin portion 22*a* and disposed on the rear surface of the mounting disk portion 22*e*. At this point, the centers of the second through hole 22*g*, the fourth through hole 81*b*, and the third through hole 82*c* are aligned. The first arm portion 83*a* and the second arm portion 83*b* of the spring member 83 have the first engagement portion 82*b* and the second engagement portion 81*a* interposed therebetween. Then, the fixing portion 84*a* of the pin member 84 is extended through the fourth through hole 81*b* and press fitted in the second through hole 22*g*.

Referring to FIG. 11, with the drag sound generation mechanism 56 described above, when the spool 4 is rotated or reverse rotated during drag operations, the pawl member 82 will pivot from the neutral position to the first position or the second position. The contact portion 82*a* of the pawl member 82 will repeatedly contact the teeth 80*a* of the disk member 80 and generate sound.

Figure 12:
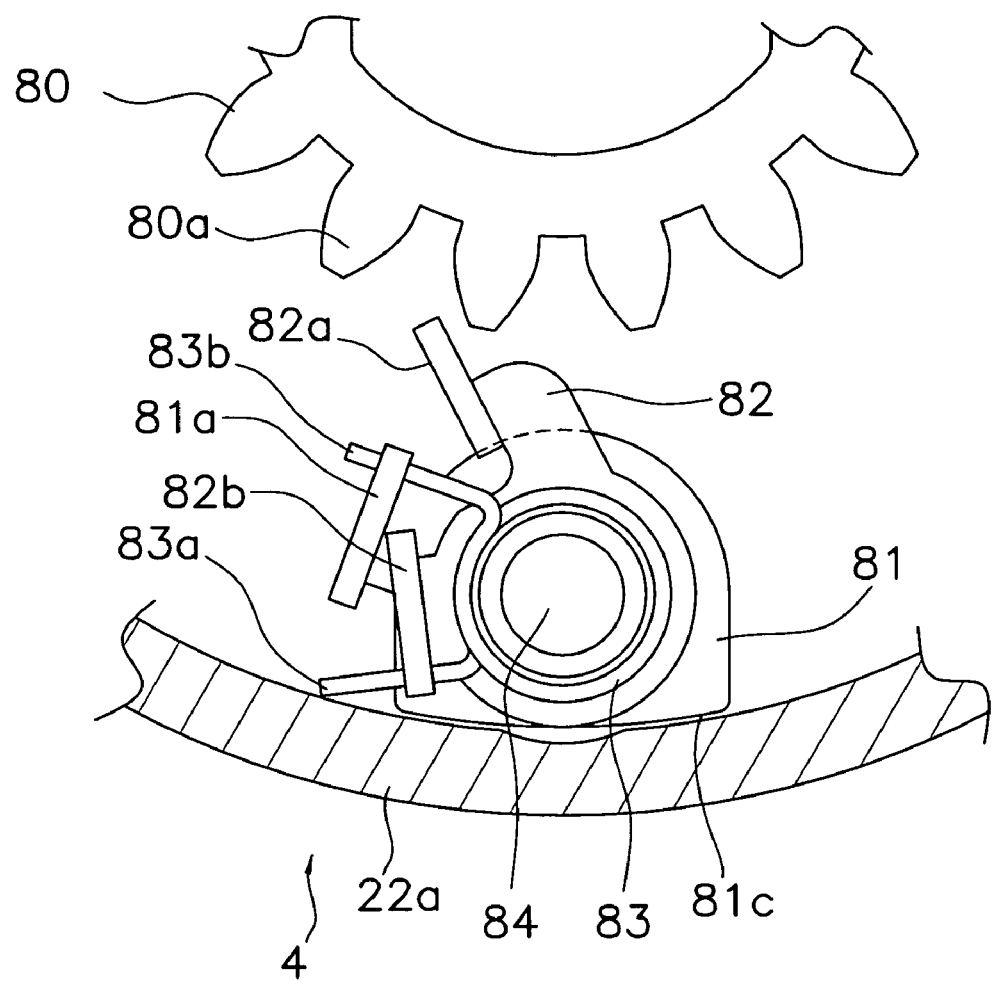
FIG. 12 is a rear view of the pawl member of the drag sound generation mechanism illustrated in FIGS. 9–11 in a first position in accordance with one embodiment of the present invention.
Figure 13:
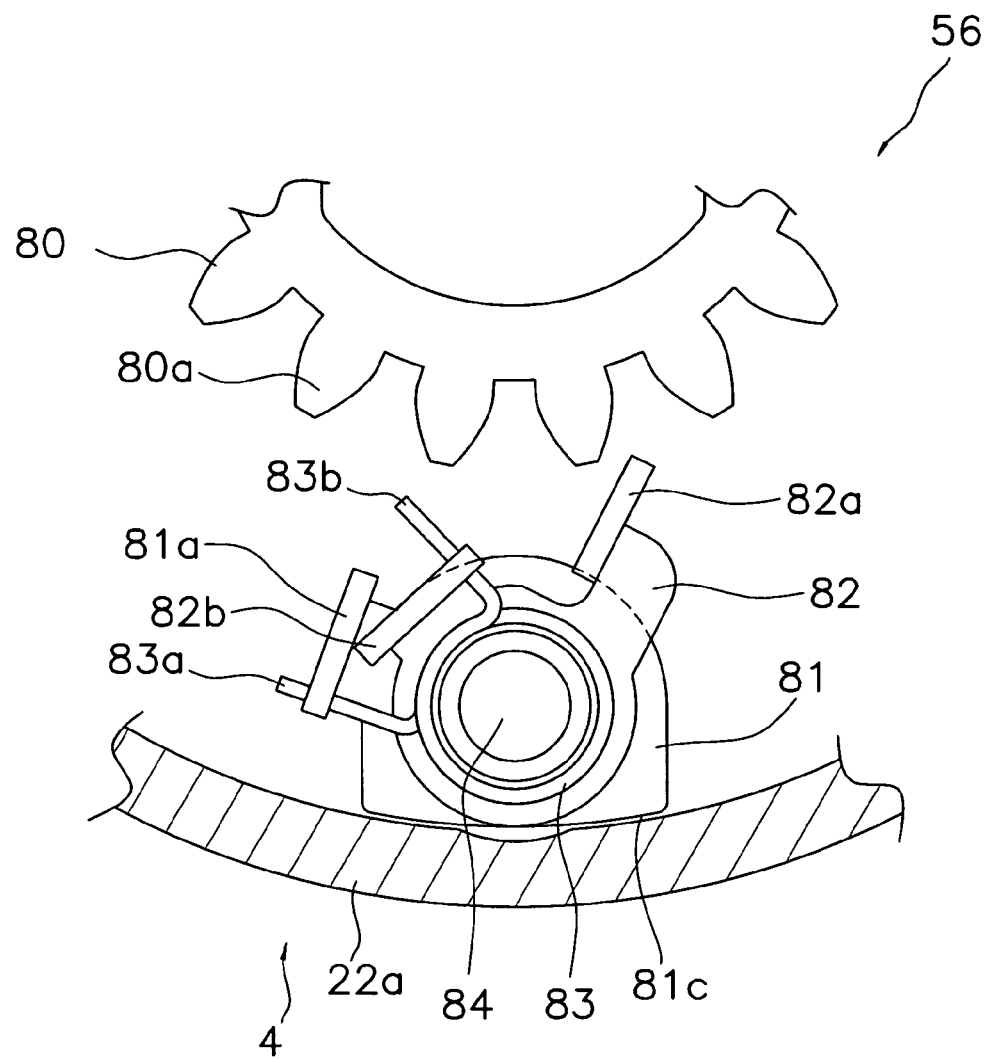
FIG. 13 is a rear view of the pawl member illustrated in FIGS. 9–12 in a second position in accordance with one embodiment of the present invention.

In addition, in the drag sound generation mechanism 56, the pawl member 82 and the engagement member 81 are engaged by means of the first arm portion 83*a* and the second arm portion 83*b* of the spring member 83. Referring to FIG. 12, when the contact portion 82*a* is positioned in the neutral position, the second engagement portion 81*a* of the engagement member 81 is engaged so as to be interposed between the first arm portion 83*a* and the second arm portion 83*b* of the spring member 83. When the contact portion 82*a* is positioned in the first position, the second engagement portion 81*a* is only engaged with the second arm portion 83*b* and the first engagement portion 82*b* is only engaged with the first arm portion 83*a*. By spreading the first arm portion 83*a* to the left side, the pawl member 82 will be urged to the neutral position (the right side in FIG. 12). In addition, referring to FIG. 13, when the contact portion 82*a* is positioned in the second position, the second engagement portion 81*a* is only engaged with the first arm portion 83*a* and the first engagement portion 82*b* is only engaged with the second arm portion 83b. By spreading the second arm portion 83b to the right side, the pawl member 82 will be urged to the neutral position (the left side in FIG. 13). Thus, the pawl member 82 is designed so that if the contact portion 82a pivots to either the first position or the second position, it will always return to the neutral position.

The pawl member 82 and the engagement member 81 are fixed in one location of the mounting disk portion 22e to be pivotable and non-movable with respect to the mounting disk portion 22e by means of the pin member 84. It will be apparent to one of skill in the art that it is possible to simply form in one location the second through hole 22g that mounts the pin member 84 in the mounting disk portion 22e, thereby eliminating the need to form a projection to engage the spring member 83 on the rear portion of the spool 4. Thus, the spool 4 is easily formed and is reduced in weight.

Furthermore, the first engagement portion 82b of the pawl member 82 and the second engagement portion 81a of the engagement member 81 have shapes that project radially outward and axially rearward. It will be apparent to one of skill in the art that the first engagement portion 82b and the second engagement portion 81a are not limited to these shapes so long as the spring member 83 capable of being engaged. In addition, the shapes of the first arm portion 83a and the second arm portion 83b of the spring member 83 are also not limited to shapes that project radially outward.

The spring member 83 is mounted in the mounting groove 84d of the pin member 84. However, it will be apparent to one of skill in the art from this disclosure that a configuration is also possible in which, for example, a mounting groove 84d is not formed in the pin member 84. In addition, the spring member 83 is not limited to a twisted coil spring and may be substituted with another type of urging member.

The pin member 84 was press-fitted. However, it will be apparent to one of skill in the art from this disclosure that the method of fixing the pin member 84 is not limited to this and may be another fixing means.

The pin member 84 was formed from a copper alloy such as brass or the like. However, it will be apparent to one of skill in the art from this disclosure that the pin member 84 may be formed from other metals such as an aluminum alloy or a stainless steel alloy. The 84 may also be formed from a synthetic resin.

As shown in FIGS. 1, 2 and 5, the lever brake mechanism 6 has a brake portion 16, a brake lever 17, a lever coil spring 19 and a brake mechanism or predetermined brake mechanism 21. The brake lever 17 adjusts a brake force of the brake portion 16. The lever coil spring 19 urges the brake lever 17 in a direction away from the mounting portion 2c. The predetermined brake mechanism 21 is switched between a predetermined brake state and a brake release state by means of the brake lever 17.

As shown in FIG. 2, the brake portion 16 has a brake unit 31 that contacts a tip of the brake lever 17 during braking, and a pawl type one way clutch 32 that will engage/disengage the rotor 3 and the brake unit 31 in accordance with the rotational direction of the rotor 3.

The brake unit 31 has a tubular member 40 and a brake cylinder 41. The tubular member 40 is concentrically disposed with the rotor 3 on the inner peripheral side of the rotor 3. The brake cylinder 41 is fixed to an inner peripheral surface of the tubular member 40.

As shown in FIG. 2, the brake tubular member 40 is a dual layered tubular member having an outer brake tubular portion 40a, an inner brake tubular portion 40b, a brake disk portion 40c and a plurality of annular grooves 40d. The outer brake tubular portion 40a is concentrically disposed on an inner peripheral side of the cylindrical portion 3a. The inner brake tubular portion 40b is disposed on an inner peripheral side of the outer tubular portion 40a. The brake disk portion 40c links the outer brake tubular portion 40a and the inner brake tubular portion 40b. Preferably, three annular grooves 40d are formed on an outer peripheral surface of a rear end portion of the outer brake tubular portion 40a near the reel unit 2, for example. The three annular grooves 40d are spaced apart in the axial direction. Each of the annular grooves 40d has a friction ring 30 mounted therein. The inner brake tubular portion 40b is rotatably mounted on the installation member 2e by means of a fourth bearing 14c that is mounted on an outer peripheral surface of the installation member 2e.

The brake cylinder 41 is a closed-end tubular member. The 41 is made of metal for example. The brake cylinder 41 has a central hole therein and is mounted from an inner peripheral surface of the outer brake tubular portion 40a to the brake disk portion 40c. The brake cylinder 41 is screwed onto the brake disk portion 40c. The tip of the brake lever 17 contacts an inner peripheral surface of the brake cylinder 41 to brake the brake tubular member 40.

Figure 7:
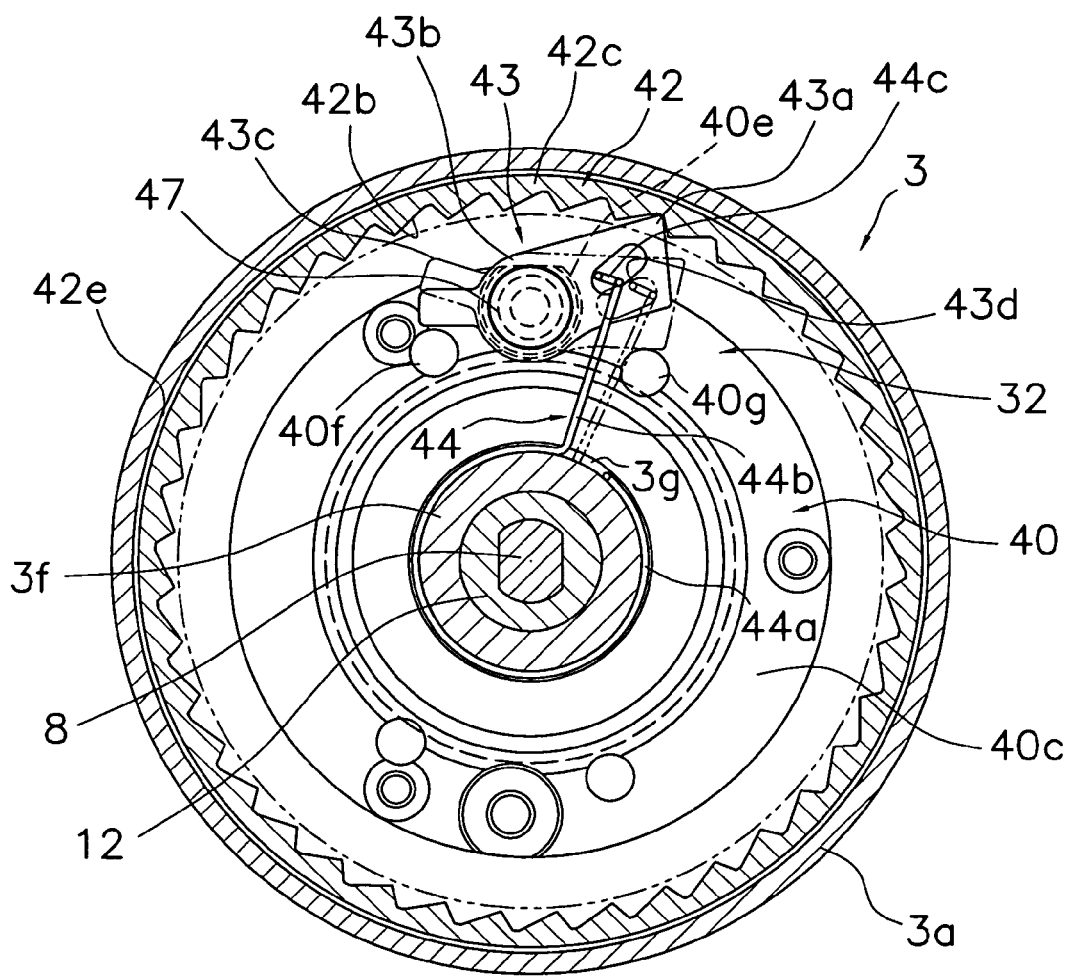
FIG. 7 is a cross-sectional view taken along line VII—VII of the brake portion illustrated in FIG. 2 in accordance with one embodiment of the present invention.
Figure 8:
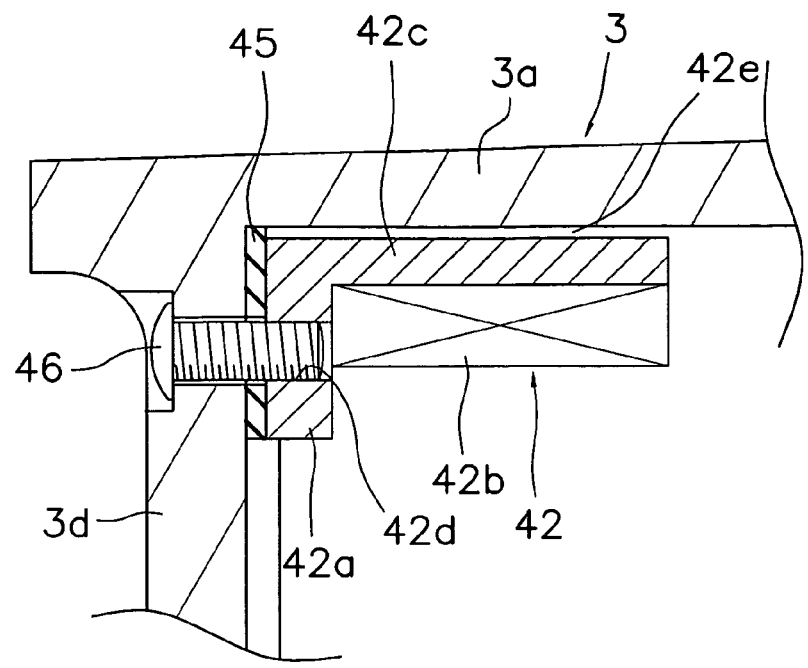
FIG. 8 is an enlarged cross-sectional view of a ratchet wheel of the one way clutch of the spinning reel illustrated in FIG. 1 in accordance with one embodiment of the present invention.

The one way clutch 32 is a pawl type one way clutch. The one way clutch 32 will engage the rotor 3 and the outer brake tubular portion 40a of the brake unit 31 only when rotated in the line release direction of the rotor 3. The one way clutch 32 will rotate the brake tubular member 40 in association with the rotor 3. Thus, when the rotor 3 rotates in the line winding direction, the rotor 3 and the outer brake tubular member 40a will be disengaged. Accordingly the rotation will not be transmitted from the rotor 3 to the outer brake tubular member 40a. As shown in FIGS. 2, 7 and 8, the one way clutch 32 has a ring shaped ratchet wheel 42, a ratchet pawl 43, an urging member 44 and a vibration absorption member 45. The ratchet wheel 42 is fixed to the front wall 3d of the cylindrical portion 3a of the rotor 3. The ratchet pawl 43 is pivotally mounted on the brake disk portion 40c. A tip of the ratchet pawl 43 is contactable with the ratchet wheel 42. The urging member 44 urges the tip of the ratchet pawl 43 into contact with the ratchet wheel 42. The vibration absorption member 45 is disposed between the ratchet wheel 42 and the front wall 3d.

As shown in FIGS. 7 and 8, the ratchet wheel 42 is fixed to a rear surface of the front wall 3d of the cylindrical portion 3a of the rotor 3 (the surface on the right side of FIG. 8) by means of a plurality of installation screws 46. The ratchet wheel 42 includes a disk shaped wheel flange portion 42a, a plurality of saw-tooth shaped ratchet teeth 42b, a wheel tubular portion 42c, a plurality of screw holes 42d and a gap 42e. The wheel flange portion 42a is fixed to the front wall 3d. The saw-tooth shaped ratchet teeth 42b are formed on an inner peripheral surface of the wheel tubular portion 42c. The wheel tubular portion 42c is unitarily formed with the wheel flange portion 42a. The screw holes 42d are formed on the wheel flange portion 42a and are spaced apart in a circumferential direction. The installation screws 46 are screwed into the screw holes 42d to fix the ratchet wheel 42 to the front wall 3d. The vibration absorption member 45 is mounted between the wheel flange portion 42a and the front wall 3d. The gap 42e is formed between an outer peripheral surface of the tubular portion 42c and the inner peripheral surface of the cylindrical portion 3a. The gap 42e prevents the transmission of vibrations to the cylindrical portion 3a during meshing between the ratchet teeth 42b and the ratchet pawl 43.

The ratchet pawl 43 is pivotally arranged on the brake disk portion 40c. The ratchet pawl 43 pivots between a mesh position, shown with a solid line in FIG. 7, in which the ratchet pawl 43 is meshed with the ratchet teeth 42b and a mesh release position shown with a dashed line in FIG. 7, in which the ratchet pawl 43 is separated from the ratchet teeth 42b. The ratchet pawl 43 has a pawl portion 43a, a pivot mounting portion 43b, a positioning projection 43c and an oval shaped engagement hole 43d. The pawl portion 43a is located on a tip section of the ratchet pawl 43 and is tapered to an acute angle. The pawl portion 43a meshes with the ratchet teeth 42b. The pivot mounting portion 43b is on an intermediate section of the ratchet pawl 43 and is pivotally mounted on a ratchet pawl pivot shaft 47. The positioning projection 43c extends radially outward from a base end of the ratchet pawl 43. The engagement hole 43d engages with the urging member 44 and is formed between the pivot mounting portion 43b and the pawl portion 43a. The ratchet pawl pivot shaft 47 is screwed into the boss portion 40e of the brake disk portion 40c.

Referring to FIG. 7 the brake disk portion 40c further includes first and second positioning bosses 40f and 40g that are erected on the disk portion 40c on either side of the ratchet pawl pivot shaft 47. The pivot range of the ratchet pawl 43 is restricted by the first and second positioning bosses 40f and 40g. The first positioning boss 40f contacts the positioning projection 43c and restricts the mesh position of the ratchet pawl 43. The first positioning boss 40f is normally disposed so that the pawl portion 43a will contact the outermost radial portion of the ratchet teeth 42b before the positioning projection 43c contacts the first positioning boss 40f. In addition, the second positioning boss 40g contacts the pawl portion 43a and restricts the mesh release position. Because the urging member 44 urges the ratchet pawl 43 in the mesh direction or the mesh release direction in accordance with the rotation direction of the rotor 3, the first and second positioning bosses 40f and 40g are arranged for both directions.

As shown in FIG. 7, the urging member 44 is a member made of metal wire having spring characteristics. The urging member 44 is bent into the approximate shape of a question mark. The urging member 44 has a circular portion 44a, an urging member arm portion 44b and an engagement projection 44c. The circular portion 44a is mounted in a secure contact state in the spring mounting groove 3g. The urging member arm portion 44b extends radially outward from the circular portion 44a. The engagement projection 44c is formed by a tip of the urging member arm portion 44b that is curved toward the engagement hole 43d. The engagement projection 44c is inserted in the engagement hole 43d and presses an inner surface of the engagement hole 43d in multiple directions. In addition, a diameter of the circular portion 44a, when the urging member 44 is free and not expanded, is smaller than a bottom diameter of the spring mounting portion 3g. Because of this, the urging member 44 is a bi-directional urging member that urges the ratchet pawl 43 in both the mesh direction (the counter-clockwise rotation direction of FIG. 7) and the mesh release direction (the clockwise rotation direction of FIG. 7). More specifically, the urging member 44 is in pressing contact with the spring mounting groove 3g, rotates in accordance with the rotation of the rotor 3 and urges the ratchet pawl 43 in both the mesh direction and the mesh release direction. In addition, if the ratchet pawl 43 is prevented from pivoting by the first or second positioning boss 40f or 40g, the circular portion 44a will slide with respect to the rotation of the rotor 3.

As a result, when the rotor 3 rotates in the line winding direction (the clockwise rotation in FIG. 7), the urging member 44 also rotates in the same direction and the ratchet pawl 43 pivots in the mesh release direction. When this occurs, the ratchet pawl 43 contacts the second positioning boss 40g. Because of this, when the rotor 3 is rotated in the line winding direction, the rotation of the rotor 3 is not transmitted to the brake tubular member 40 and the ratchet pawl 43 no longer intermittently strikes the ratchet wheel 42. As a result, the noise generated by the one way clutch 32 is reduced and the rotational resistance during rotation in the line winding direction is reduced.

In addition, when the rotor 3 rotates in the line release direction (the counter-clockwise rotation in FIG. 7), the urging member 44 also rotates in the same direction and urges the ratchet pawl 43 in the mesh direction. When this occurs, the ratchet pawl 43 pivots to the mesh position and the ratchet teeth 42b mesh with the pawl portion 43a of the ratchet pawl 43. Because of this, when the rotor 3 rotates in the line release direction, the rotation of the rotor 3 is transmitted to the brake tubular member 40 and a brake operation becomes possible by means of the lever brake mechanism 6.

Here, in an internal teeth type of one way clutch 32 in which the ratchet teeth 42b are formed on the inner peripheral surface of the ratchet wheel 42, because the ratchet pawl 43 can be urged in both directions with one urging member 44, the two functions of rotation transmission and quieting the one way clutch 32 during rotation disengagement is achieved with one urging member 44.

Referring to FIG. 2, the vibration absorption member 45 is a sheet like member having a washer shape. The vibration absorption member 45 is made of, for example, an elastic synthetic rubber such as NBR or urethane rubber. When the ratchet teeth 42b strike the ratchet pawl 43 and mesh therewith, the vibration absorption member 45 absorbs vibrations due to this striking. The vibration absorption member 45 is provided so that the vibrations are not transmitted from the ratchet wheel 42 to the rotor 3.

As shown in FIG. 1, the brake lever 17 is pivotally supported on the reel unit 2 around a second axis Y by means of a support shaft 33 that is mounted on the reel body 2a of the reel unit 2 in the second axis Y direction. The second axis Y intersects the first axis X. Preferably, the second axis Y is substantially perpendicular to the first axis X. As shown in FIG. 5, the support shaft 33 is a shaft member having a brim. The support shaft 33 has inner threads and a screw 33a that mate with the inner threads. The 33 and 33a serve to mount the lid member 2d to the case portion 2f. The support shaft 33 is threaded onto a screw 33a is inserted from the lid member 2d side and fixed to the reel unit 2. In addition, as noted above, the brake lever 17 is urged in a direction away from the mounting portion 2c by the lever coil spring 19 of the lever brake mechanism 6. The brake lever 17 is pivotally installed on the reel unit 2 between a predetermined brake position, shown with a single dashed line in FIG. 1, and a brake position shown with a double dashed line in FIG. 1. The brake position is closer to the mounting portion 2c than the brake release position. The brake lever 17 is normally maintained in either a brake release position shown with a solid line in FIG. 1, or the predetermined brake position by means of the lever coil spring 19 and the predetermined brake mechanism 21.

Referring to FIGS. 1 and 2, the brake lever 17 includes a brake operation portion 17a, a brake action portion 17b and a brake member 34. The brake operation portion 17a is curved from a support section of the support shaft 33 and extends forward. The brake action portion 17b is curved from the support section and extends diagonally forward and downward. The brake member 34 is detachably mounted to the brake action portion 17b.

The 17a extends forward from the support section of the support shaft 33 along the mounting portion 2c to near the outside of the bail arm 9 and then branches radially outward and forward. A tip of the brake operation portion 17a branches radially outward and is curved forward. The brake lever 17 further includes a first operation portion 17c and a second operation portion 17d. The first operation portion 17c is a portion of the brake lever 17 that is forward of a curved portion. The first operation portion 17c is operated with an index finger of a hand that grasps the fishing rod. The second operation portion 17d is a portion of the brake lever 17 that extends forward from the tip of the brake operation portion 17a. The second operation portion 17d is used when performing a predetermined brake operation. The first operation portion 17c is moved by pivoting the brake lever 17 from the brake release position in a direction near the mounting portion 2c.

Referring to FIG. 2, a tip of the brake action portion 17b is disposed opposite the inner peripheral side of the brake cylinder 41. The brake member 34 is detachably installed on the tip of the brake action portion 17b and is contactable with the inner peripheral surface of the brake cylinder 41. The brake member 34 is made of a resilient synthetic resin such as a polyamide resin or a polyacetal. The brake member 34 presses the brake cylinder 41 radially outward when the brake lever 17 is pivoted.

The brake lever 17 is urged by the lever coil spring 19 when the brake lever 17 is not being operated. Referring to FIG. 1, as shown by the solid line, the brake lever 17 is disposed in the brake release position in which the brake member 34 is separated from the brake cylinder 41.

The lever coil spring 19 is disposed in a compressed state between the brake operation portion 17a of the brake lever 17 and the leg portion 2b of the reel unit 2. The lever coil spring 19 urges the brake lever 17 toward the brake release side and in the counter-clockwise direction of FIG. 1. In this way, when one releases their hand from the brake lever 17 after braking, the rotor 3 will be placed in the brake release state.

In addition, the brake lever 17 is also used in order to switch the predetermined brake mechanism 21 between the brake release state, shown in FIG. 6(a), and the predetermined brake state, shown in FIG. 6(b). Referring to FIG. 2, the brake lever 17 further includes an oval engagement cut-out 17e. The 21 includes a lever member 27. The engagement cut-out 17e engages with a tip portion of the lever member 27 of the predetermined brake mechanism 21. The engagement cut-out 17e is formed in the brake action portion 17b. The engagement cut-out 17e is a cut-out having a surface area that is larger than the cross-sectional area of a tip portion of the lever member 27.

Referring to FIGS. 2 and 5, the predetermined brake mechanism 21 further includes a toggle spring 28, a friction member 29 and a plurality of friction rings 30. The lever member 27 pivots in association with the brake lever 17. The toggle spring 28 holds the lever member 27 in the brake release position and the predetermined brake position. The friction member 29 is relatively rotatably mounted on the tubular member 40. The friction member 29 frictionally engages with the tubular member 40. Preferably, the predetermined brake mechanism 21 has three friction rings 30. The friction rings 30 are composed of, for example, O-rings that are mounted in the annular grooves 40d in order to frictionally engage the friction member 29 with the tubular member 40.

Figure 6:
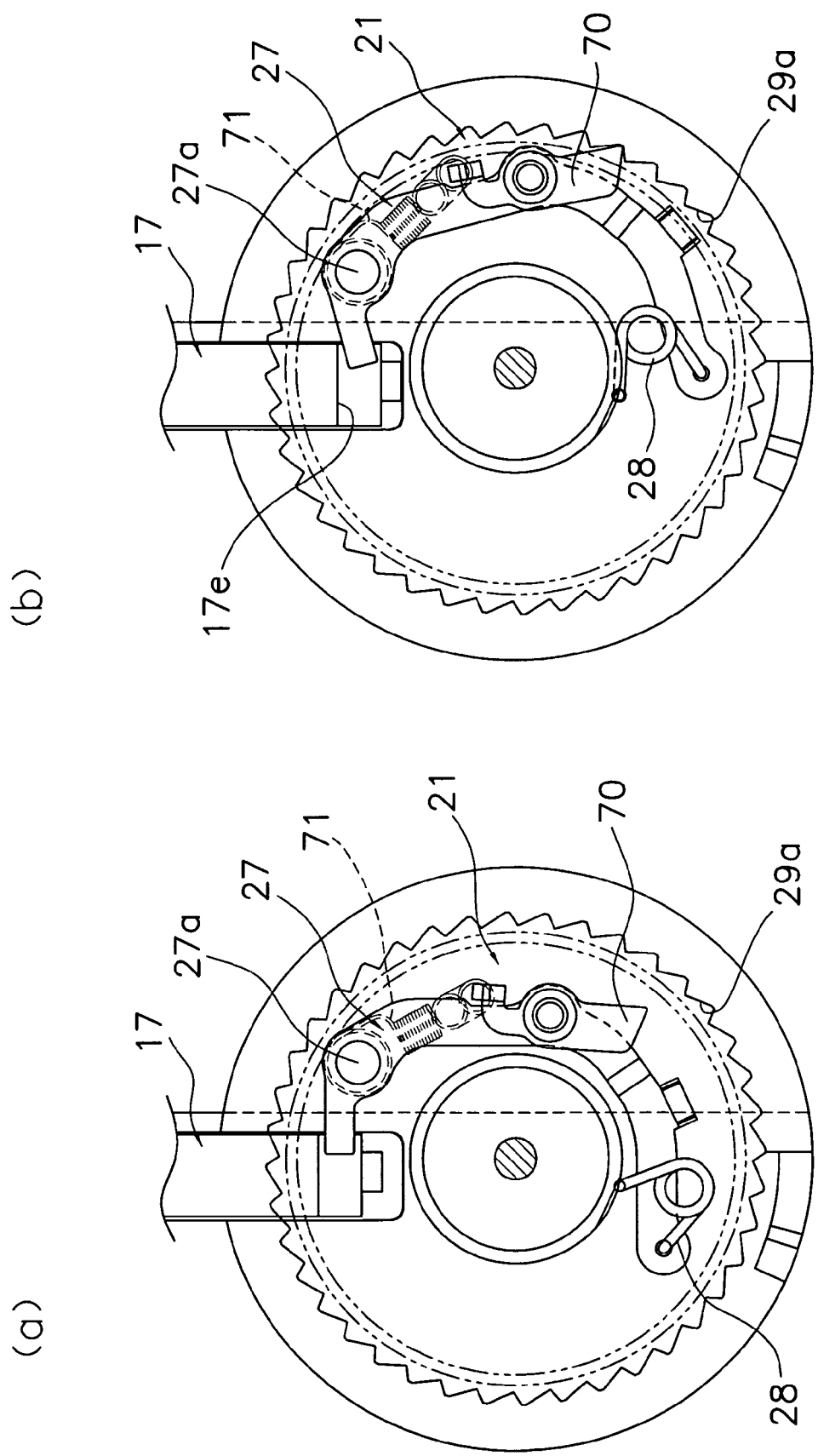
FIG. 6 is cross-sectional view of the spinning reel with the one way clutch illustrated in FIG. 1 showing an operation of the brake lever member in a brake release state and a predetermined brake state in accordance with one embodiment of the present invention.

As shown in FIGS. 5 and 6, the lever member 27 has a lever member pivot shaft 27a and an engagement pawl 70. The lever member 27 is pivotally mounted on the lever member pivot shaft 27a. The lever member pivot shaft 27a is disposed in parallel with the spool shaft 8 on the front portion of the reel unit 2. The distance from a base end of the lever member 27 to a center of the lever member pivot shaft 27a is two or more times longer than a distance from a tip of the lever member 27 to the center of the lever member pivot shaft 27a. The tip of the lever member 27 is engaged with the engagement cut-out 17e. The toggle spring 28 is engaged with the base end of the lever member 27. The lever member 27 pivots between the brake release position (FIG. 6(a)) and the predetermined brake position (FIG. 6(b)) in association with the brake lever 17.

The engagement pawl 70 is pivotally mounted on the lever member 27. The engagement pawl 70 has a spring engagement portion 70a on a base end and an acutely angled engagement pawl portion 70b on a tip. The engagement pawl 70 is urged in the direction in which the engagement pawl portion 70b projects (the counter-clockwise direction in FIG. 5) by means of a pawl coil spring 71.

When in the brake release position, the base end of the lever member 27 is urged by means of the toggle spring 28. The tip of the lever member 27 contacts an upper surface of the engagement cut-out 17e. The tip of the lever member 27 contacts a lower surface of the engagement cut-out 17e when in the predetermined brake position. The engagement pawl 70 is pivotally mounted on a central portion of the lever member 27. One end of the pawl coil spring 71 is engaged with the spring engagement portion 70a and another end of the pawl coil spring 71 is engaged with the lever member pivot shaft 27a.

As shown in FIGS. 5, 6(a) and 6(b), the toggle spring 28 urges the lever member 27 to urge the brake lever 17 between the predetermined brake position and the brake release position. The toggle spring 28 retains the brake lever 17 in these positions. The toggle spring 28 is a twisted coil spring that is mounted on the base end of the lever member 27. One end of the toggle spring 28 is engaged with the base end of the lever member 27 and another end is engaged with the front end surface of the reel body 2a. When the lever member 27 is disposed in the brake release position, the toggle spring 28 will urge the lever member 27 in the clockwise direction of FIG. 6(a), and when disposed in the predetermined brake position, will urge the lever member 27 in the counter-clockwise direction of FIG. 6(b). In this way, the lever member 27 is retained in the brake release position and the predetermined brake position. Furthermore, the brake lever 17 is retained in the brake release position and the predetermined brake position.

Referring to FIGS. 2 and 5, the friction member 29 is a tubular member that is rotatably mounted on the outer periphery of the tubular member 40. The friction member 29 has a plurality of saw-tooth shaped friction curved portions 29a. The friction curved portions 29a project radially inward from an inner peripheral surface of the 29 at a rearward end of the friction member 29 (the right end in FIG. 2). The friction curved portions 29a engage with the engagement pawl portion 70b of the engagement pawl 70. When the lever member 27 is in the predetermined brake position (FIG. 6(b)), the friction curved portions 29a are arranged so as to engage the engagement pawl 70 and prevent rotation of the friction member 29 in the line release direction. A tabbed washer 72 having, for example, four radial projections on an outer periphery thereof and a disk shaped first washer 73 are mounted between a forward end of the friction member 29 (the left end in FIG. 2) and an outer surface of the disk portion 40c. The 29 further has a plurality of friction member engagement grooves 29b and a friction member annular groove 29c. Preferably, there are six friction member engagement grooves 29b. The tabbed washer 72 is non-rotatably engaged with the friction member engagement grooves 29b, which are spaced apart in a circumferential direction from one end surface of the friction member 29 to another end thereof. The tabbed washer 72 and the first washer 73 are retained by means of a retaining spring 74 that is curved into a C-shape. The friction member annular groove 29c is formed in an inner peripheral surface of the forward end of the friction member 29. The retaining spring 74 is mounted in the 29c. In addition, a second washer 75 is mounted between the friction curved portions 29a and the brake tubular member 40. The tabbed washer 72, the first washer 73 and the second washer 75 are provided in order to adjust the installation dimensions in the axial direction of the friction member 29 so that there is no play in the friction member 29.

When the lever member 27 is positioned in the predetermined brake position and the engagement pawl 70 is engaged with the friction curved portions 29a, the friction member 29 will frictionally slide with respect to the brake tubular member 40 by operation of the friction rings 30. When the lever member 27 is pivoted to the predetermined brake position, relative rotation between the pawl portion 70b and the friction curved portion 29a of the friction member 29 will not match. Even if the pawl portion 70b contacts the projecting portion of the friction curved portion 29a, shocks are absorbed and the friction member 29 is reliably prevented from rotating.

When the brake lever 17 is pushed into the predetermined brake position, the lever member 27 will also pivot from the brake release position to the predetermined brake position in association therewith. As a result, the engagement pawl 70 will engage with the friction curved portions 29a of the friction member 29 and will brake the rotation of the rotor 3 in the line release direction in the predetermined brake state.

During casting, the bail arm 9 is tilted to a line release position and the fishing line is released from the outer periphery of the spool 4. During winding of the fishing line, the bail arm 9 will return to a line winding position by means of a return mechanism (not shown). When the handle 1 is rotated in the line winding direction, the rotational force of the handle 1 is transmitted via the handle shaft 10 and the master gear 11 to the pinion gear 12. The rotational force transmitted to the pinion gear 12 is transmitted to the rotor 3 via the front portion 12a of the pinion gear 12. Because the rotor 3 will rotate in the line winding direction at this time, the ratchet pawl 43 of the one way clutch 32 is urged to the mesh release position by the urging member 44. The mesh between the ratchet pawl 43 and the ratchet wheel 42 is then released and the rotational force is no longer transmitted to the brake tubular member 40.

If the brake lever 17 is not operated, the brake lever 17 is pressed by operation of the coil spring 19 and the predetermined brake mechanism 21 and is disposed in the brake release position or the predetermined brake position.

When the rotor 3 is rotated in reverse to catch a fish, the first operation portion 17c of the brake lever 17 is pulled toward the mounting portion 2c side by the fisherman's index finger, for example, to adjust the braking force.

When the fishing line is pulled by a fish and the rotor 3 reverse rotates in the line release direction, the rotational force is transmitted to the brake tubular member 40 via the one way clutch 32. The rotational force is then transmitted to the brake cylinder 41. When the rotor 3 rotates in the line release direction, the ratchet pawl 43 of the one way clutch 32 is urged by the urging member 44 to pivot to the mesh position. When the ratchet pawl 43 pivots to the mesh position, the ratchet teeth 42b of the ratchet wheel 42 strike the tip of the pawl portion 43a of the ratchet pawl 43, thereby causing the ratchet wheel 42 to vibrate. However, the vibration is absorbed by the vibration absorption member 45 and is not transmitted to the rotor 3. Because of this, an unpleasant sensation will rarely be imparted to the fisherman. In addition, there will rarely be an adverse impact on the ratchet teeth 42b and the ratchet pawl 43.

When the ratchet teeth 42b mesh with the ratchet pawl 43, the rotation of the rotor 3 is transmitted to the brake tubular member 40 and the brake cylinder 41 rotates together with the rotor 3. When the first operation portion 17c of the brake lever 17 is pulled inwardly in a direction toward the mounting portion 2c, the lever member 27 pivots to the brake release position even if the brake lever 17 is, for example, in the predetermined brake position. As a result, the predetermined brake state due to the predetermined brake mechanism 21 is temporarily released. At this point, the toggle spring 28 reverses due to the pivot of the lever member 27. Accordingly, the lever member 27 is urged to the brake release position. The lever member 27 is retained on the brake release position side (FIG. 6(a)).

When the brake lever 17 is operated in a direction that approaches the mounting portion 2c, the brake member 34 of the brake lever 17 strongly presses the inner peripheral surface of the brake cylinder 41 radially outward. The brake force is adjusted by increasing or decreasing the force applied to the brake lever 17. Accordingly, the amount of reverse rotation of the rotor 3 is freely adjusted. As a result, the brake force applied to the operation force of the brake lever 17 is applied to the rotor 3. Thus, even if one forgets to release the predetermined brake state, the predetermined brake state is released by simply pulling the brake lever 17 inwardly.

When traveling to a fishing spot or storing the reel, the fisherman's hand is removed from the first operation portion 17c and the second operation portion 17d is pushed in a direction away from the mounting portion 2c. When this occurs, as shown in FIGS. 5 and 6(b), the lever member 27 will pivot from the brake release position to the predetermined brake position. The lever member 27 will be retained in the predetermined brake position by means of the toggle spring 28. As a result, the engagement pawl 70 will be engaged with the friction curved portions 29a of the friction member 29 to prevent the rotation of the friction member 29 and the reverse rotation of the rotor 3.

The brake force at the predetermined brake position is fixed by means of the resilient force of the friction rings 30 mounted between the friction member 29 and the brake tubular member 40. Because of this, even if something strikes the handle 1 during travel, a predetermined brake force that is strong enough to prevent the handle 1 from rotating is easily maintained. Accordingly, it is be possible to set a predetermined brake force that is strong enough to prevent line slack from being produced during travel to a fishing spot. In addition, because braking is performed by the relative rotation of the friction member 29 and the brake tubular member 40, the braking force rarely varies and is stable.

Furthermore, in the event that one wants to move the rotor 3 from the predetermined brake state to the brake release state in order to change the hang length of tackle, securely hook a fish on the tackle when the fish strikes, or the like, the brake lever 17 is configured to be operated in a direction slightly near the mounting portion 2c. When this is done, as noted above, the second lever member 27 is pivoted to the brake release position by means of the brake lever 17 to temporarily release the predetermined brake state.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention and relative to the view of the fisherman standing behind the reel unit 2.

Second Embodiment

Figure 14:
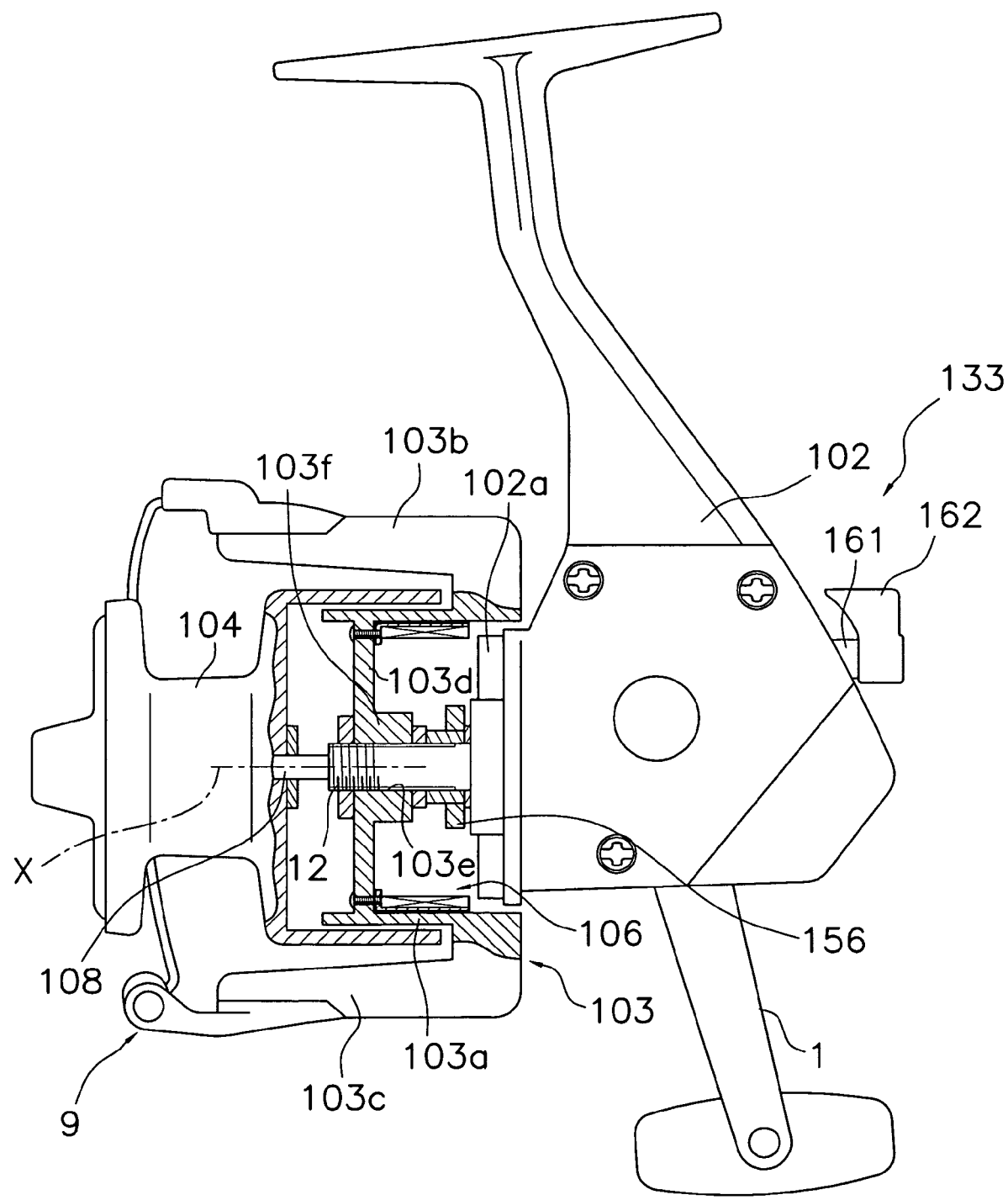
FIG. 14 is a partial cross-sectional view of a spinning reel equipped with a one way clutch in accordance with a second embodiment of the present invention.

Referring now to FIG. 14, a spinning reel in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the aforementioned first embodiment, the one way clutch 32 having the lever brake mechanism 6 of a lever brake type spinning reel was described as an example of the present invention. However, the present invention is not limited to this, and the present invention may be used in another type of spinning reel.

In FIG. 14, a spinning reel according to a second embodiment of the present invention is a spinning reel, which does not have the lever brake mechanism 6 of the first embodiment. Rather, the spinning reel of the second embodiment has a reverse rotation prevention mechanism 106. The spinning reel of the second embodiment winds the fishing line around the first axis X that extends in a longitudinal direction through the fishing rod. The spinning reel includes a reel unit 102, a rotor 103, a spool 104 and a spool shaft 108. The reel unit 102 has a handle 1 attached thereto. The rotor 103 is rotatably supported around the first axis X on a front portion of the reel unit 102. The spool 104 is disposed on the front portion of the rotor 103. The fishing line is wound around the spool 104.

A rotor drive mechanism 5 has the pinion gear 12 and an oscillating mechanism 20. The pinion gear 12 aids in rotation of the rotor 103. The oscillating mechanism 20 reciprocally moves the spool 104 forward and backward via a spool shaft 108. The rotor drive mechanism 5, pinion gear 12 and the oscillating mechanism 20 are arranged in the interior of the reel unit 102.

The rotor 103 is, for example, made of an aluminum alloy or a synthetic resin, and is rotatably supported by the reel unit 102. The rotor 103 includes a cylindrical portion 103a, a first arm 103b, a second arm 103c, a front wall 103d, a through hole 103e and a boss portion 103f. The first and second arms 103a and 103b are arranged opposite each other on the sides of the cylindrical portion 103a. The through hole 103e runs through the boss portion 103f. The boss portion 103f is formed on a central portion of the front wall 103d of the cylindrical portion 103a. The spool shaft 108 and the pinion gear 12 pass through the through hole 103e.

As shown in FIG. 14, the pivotable bail arm 9 is provided between a tip of the first arm 103b and a tip of the second arm 103c. The fishing line is guided onto the spool 104 by means of the bail arm 9. The reverse rotation prevention mechanism 106 prevents the reverse rotation of the rotor 103 in the line release direction. The reverse rotation prevention mechanism 106 is provided in the interior of the cylindrical portion 103a of the rotor 103.

Figure 17:
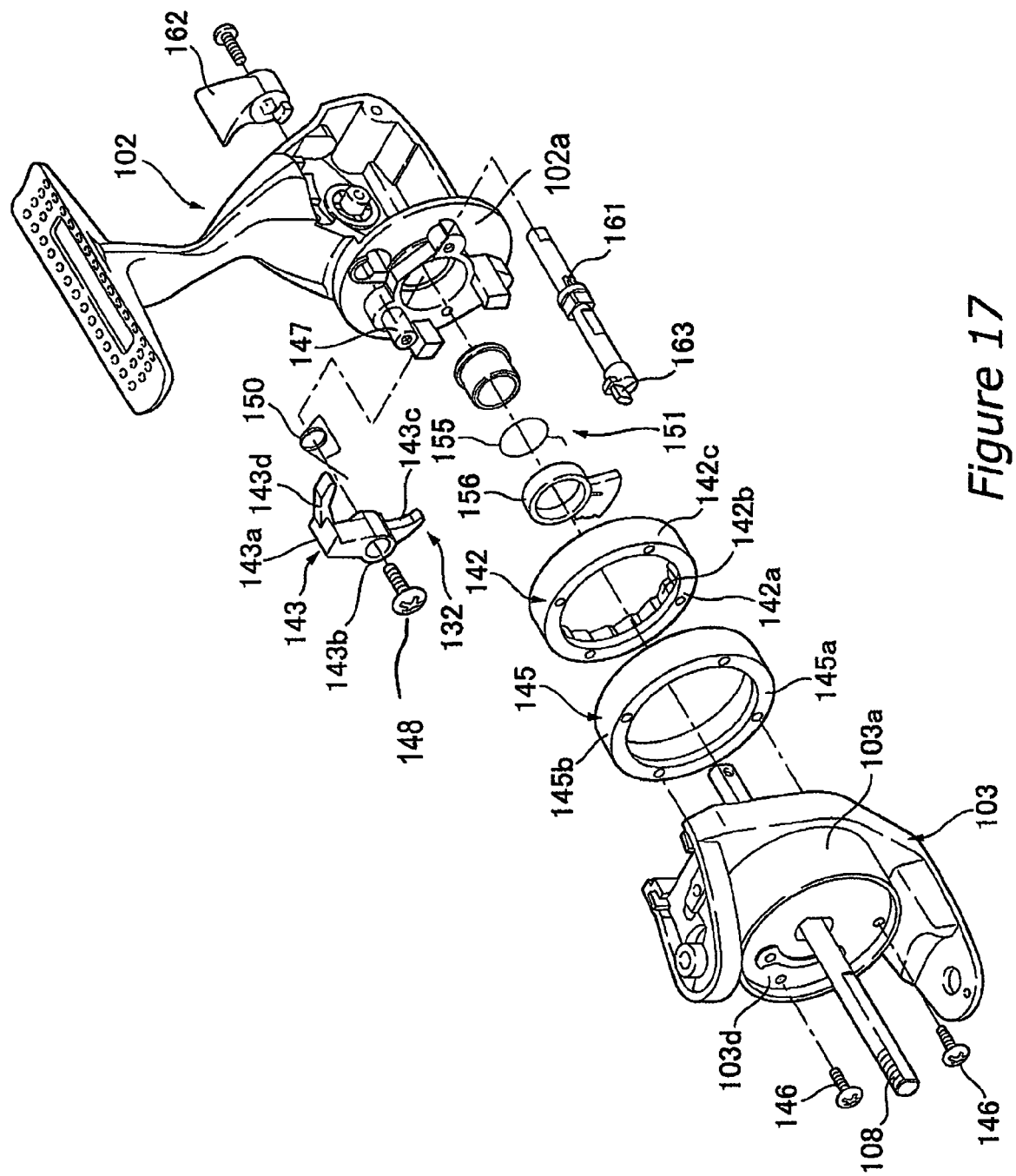
FIG. 17 is an exploded view of the spinning reel equipped with the one way clutch illustrated in FIG. 14 in accordance with the second embodiment of the present invention.

As shown in FIGS. 14 and 17, the reverse rotation prevention mechanism 106 has a one way clutch 132 and a switch operation portion 133. The switch operation portion 133 switches the one way clutch 132 between a reverse rotation permitted state and a reverse rotation prohibited state.

The one way clutch 132 is a pawl type one way clutch. Specifically, the one way clutch 132 selectively prevents or permits the reverse rotation of the rotor 103 in the line release direction by means of the operation of the switch operation portion 133. Thus, the rotation of the rotor 103 in the line winding direction will always be allowed.

As shown in FIGS. 15–18, the one way clutch 132 has a ring shaped ratchet wheel 142, a ratchet pawl 143, an urging member 144 and a vibration absorption member 145. The ratchet pawl 143 is pivotally mounted on a front portion 102a of the reel unit 102. A tip of the ratchet pawl 143 is configured to contact the ratchet wheel 142. The urging member 144 urges the tip of the ratchet pawl 143 into contact with the ratchet wheel 142. The vibration absorption member 145 is disposed between the ratchet wheel 142 and the front wall 103d.

The ratchet wheel 142 is fixed to a rear surface of the front wall 103d of the rotor 103 by a plurality of installation screws 146. Preferably, four installation screws 146 secure the ratchet wheel 142 to the rear surface of the front wall 103d. The ratchet wheel 142 includes a disk shaped flange portion 142a, a plurality of saw-tooth shaped ratchet teeth 142b, a ratchet wheel tubular portion 142c and a plurality of screw holes 142d. The flange portion 142a is fixed to the front wall 103d. The saw-tooth shaped ratchet teeth 142b are formed on an inner peripheral surface of the ratchet wheel tubular portion 142c. The ratchet wheel tubular portion 142c is unitarily formed with the flange portion 142a. The screw holes 142d are spaced apart in a circumferential direction and are formed on the flange portion 142a. The installation screws 146 are screwed into the screw holes 142d to fix the ratchet wheel 142 to the front wall 103d. The vibration absorption member 145 is mounted between the flange portion 142a and the rear surface of the front wall 103d and between an inner peripheral surface of the cylindrical portion 103a and the ratchet wheel tubular portion 142c.

Figure 15:
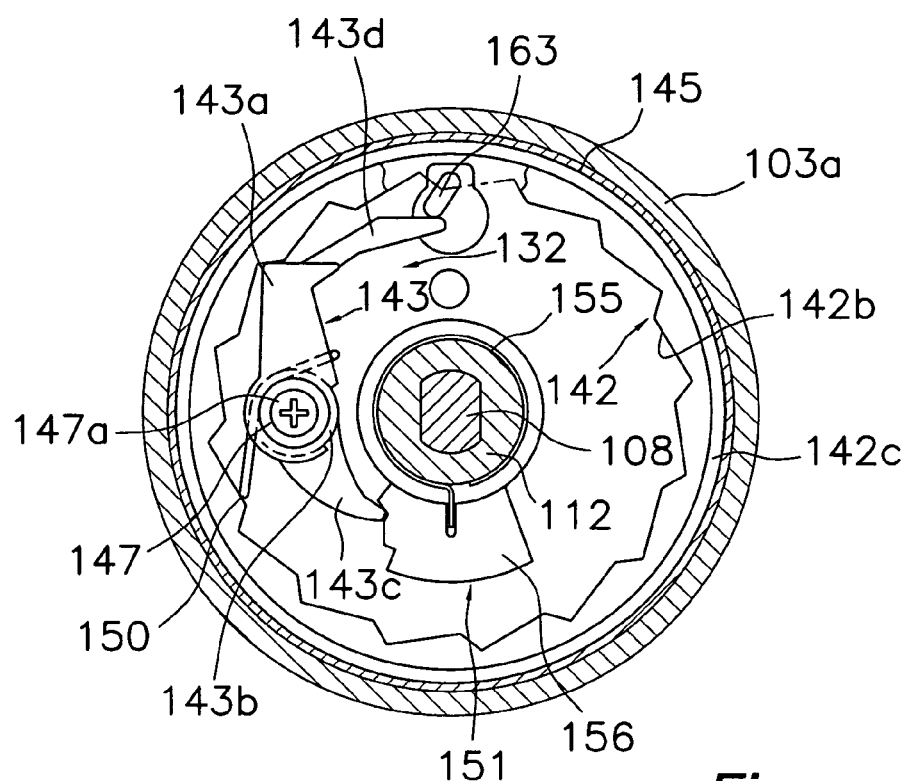
FIG. 15 is a partial cross-sectional view of the one way clutch of the spinning reel illustrated in FIG. 14 in a reverse rotation prohibited state in accordance with the second embodiment of the present invention.
Figure 16:
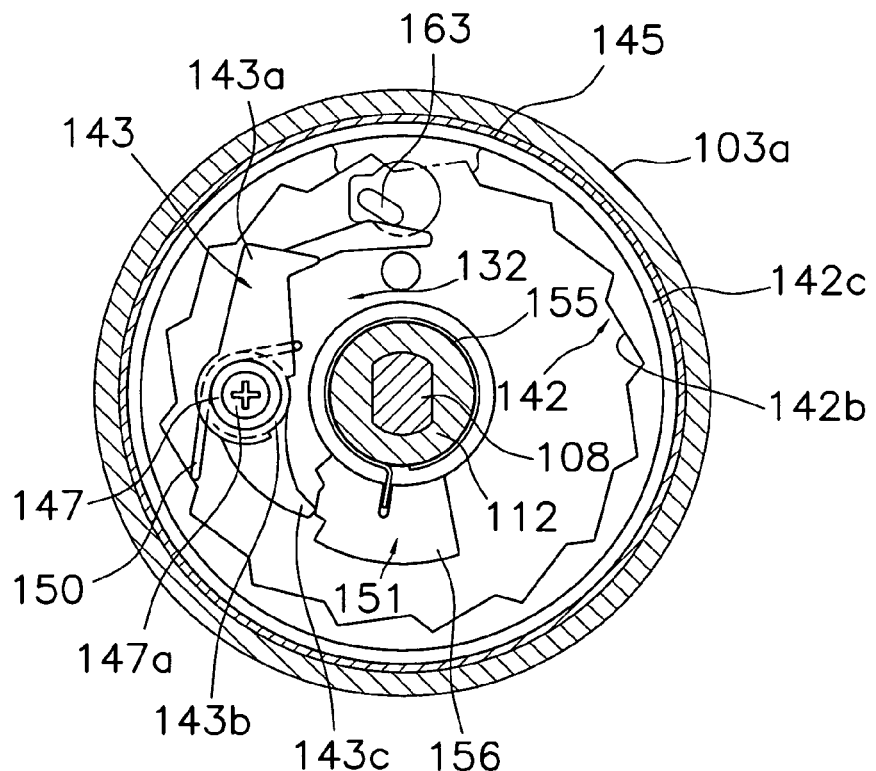
FIG. 16 is a partial cross-sectional view of the one way clutch of the spinning reel illustrated in FIG. 14 in a reverse rotation permitted state in accordance with the second embodiment of the present invention.

The ratchet pawl 143 is pivotally arranged on the front portion 102a of the reel unit 102 between a mesh position, shown in FIG. 15, and a mesh release position, shown in FIG. 16. In the mesh position, the ratchet pawl 143 meshes with the ratchet teeth 142b. In the mesh release position, the ratchet pawl 143 is separated from the ratchet teeth 142b. The ratchet pawl 143 has a pawl portion 143a, a pivot mounting portion 143b, a spring engagement portion 143c and a switch projection 143d. The pawl portion 143a is disposed on a tip of the ratchet pawl 143. The pawl portion 143a meshes with the ratchet teeth 142b. The pivot mounting portion 143b is on an intermediate portion of the ratchet pawl 143. The spring engagement portion 143c extends radially outward on a base end of the ratchet pawl 143. The switch projection 143d extends from the pawl portion 143a. The pivot mounting portion 143b is pivotally mounted on a pivot shaft 147. The pivot shaft 147 is erected on the front portion 102a of the reel unit 102. The ratchet pawl 143 is retained by means of an installation screw 148 that is threaded into a tip surface of the pivot shaft 147.

As shown in FIGS. 15–17, the urging member has a mesh direction urging member 150 and a mesh release direction urging member 151. The mesh direction urging member 150 always urges the ratchet pawl 143 in the mesh position. The mesh release direction urging member 151 urges the ratchet pawl 143 in the mesh release direction in association with the rotation of the rotor 103 in the line winding direction.

The mesh direction urging member 150 is a twisted coil spring wound on an outer peripheral side of the pivot shaft 147. An end of the mesh direction urging member 150 is engaged with the reel unit 102. Another end of the mesh direction urging member 150 is engaged with the ratchet pawl 143. The urging force of the mesh direction urging member 150 is weaker than the urging force of the mesh release direction urging member 151. Because of this, when the rotor 103 rotates in the line release direction, the mesh release direction urging member 151 will resist the urging force of the mesh direction urging member 150 and will urge the ratchet pawl 143 to the mesh release position.

The mesh release direction urging member 151 has a mesh spring member 155 and a pivot member 156. The mesh spring member 155 is made of metal wire having spring characteristics. At least a portion of the mesh spring member 155 is bent into the general shape of a question mark. The pivot member 156 is engaged with the mesh spring member 155. The pivot member 156 is pivotally mounted in a predetermined range around the spool shaft 108. The mesh spring member 155 is mounted in a press contact state on the pinion gear 112 on which the rotor 103 is non-rotatably mounted. The pivot member 156 is pivotally mounted on the pivot gear 112. The pivot member 156 contacts the spring engagement portion 143c when the rotor 103 rotates in the line winding direction. As a result, the mesh release direction urging member 151 urges the ratchet pawl 143 in the mesh release direction (the clockwise direction of FIGS. 15 and 16) when the rotor 103 rotates in the line winding direction and separates the ratchet pawl 143 from the ratchet wheel 142. As a result, the one way clutch 132 is quieter during winding of the fishing line.

Figure 18:
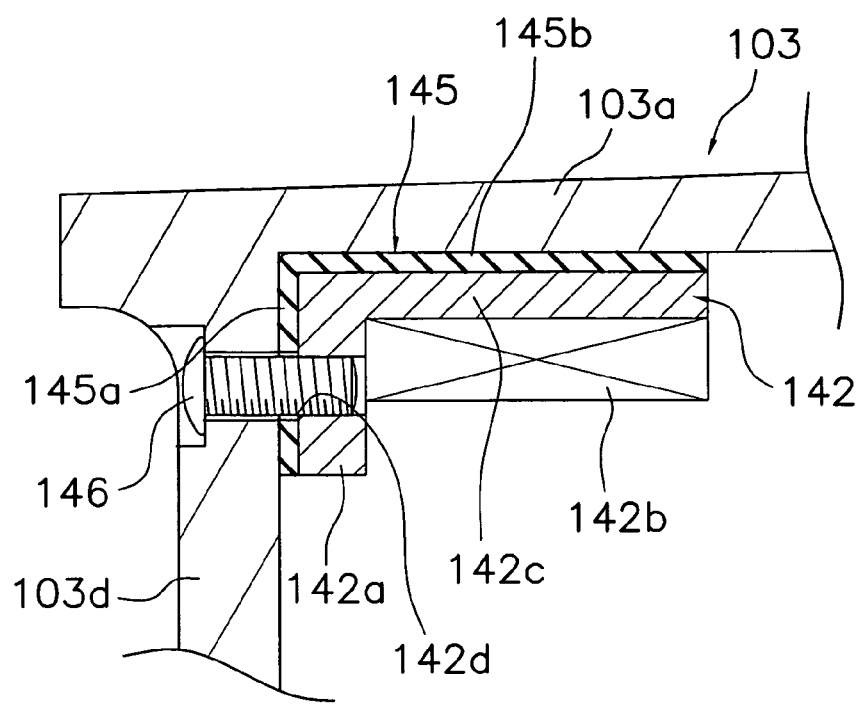
FIG. 18 is an enlarged cross-sectional view of a ratchet wheel of the one way clutch of the spinning reel illustrated in FIG. 14 in accordance with the second embodiment of the present invention.

The vibration absorption member 145 is a tubular member. The vibration absorption member 145 is made of, for example, an elastic synthetic rubber such as NBR or urethane rubber. As shown in FIG. 18, the vibration absorption member 145 has a washer shaped inner brim portion 145a and a vibration absorption member tubular portion 145b. The inner brim portion 145a is disposed between the flange portion 142a of the ratchet wheel 142 and the front wall 103d. The inner brim portion 145a contacts both the flange portion 142a and the front wall 103d. The vibration absorption member tubular portion 145b is unitarily formed with the inner brim portion 145a. The vibration absorption member tubular portion 145b is disposed between the cylindrical portion 103a and the ratchet wheel tubular portion 142c. The vibration absorption member tubular portion 145b contacts both the cylindrical portion 103a and the ratchet wheel tubular portion 142c. When the ratchet teeth 142b strike the ratchet pawl 143 and mesh therewith, the vibration absorption member 145 absorbs vibrations due to the striking. The vibration absorption member 145 is provided so that the vibrations are not transmitted from the ratchet wheel 142 to the rotor 103. Accordingly, an unpleasant sensation will rarely be imparted to the fisherman. Moreover, there will rarely be an adverse impact on the ratchet teeth 142b and the ratchet pawl 143.

As shown in FIGS. 14 and 17, the switch operation portion 133 has a stopper cam shaft 161, a stopper lever 162 and a switching cam 163. The stopper cam shaft 161 passes through the reel unit 102 from front to rear and is substantially parallel to the spool shaft 108. The stopper can shaft 161 is rotatably mounted to the reel unit 102. The stopper lever 162 is non-rotatably mounted on a rearward end of the stopper cam shaft 161. The switching cam 163 is unitarily formed with the tip of the stopper cam shaft 161. The switching cam 163 is eccentric with respect to a rotational axis of the stopper cam shaft 161. The switching cam 163 pivots with respect to the rotation of the stopper cam shaft 161. When the stopper cam shaft 161 is rotated in a reverse rotation permitted direction (the counter-clockwise direction of FIG. 16) by means of the stopper lever 162, the switching cam 163 contacts the switching projection 143d of the ratchet pawl 143 and presses the ratchet pawl 143 in the mesh release position. As a result, the one way clutch 132 is placed in the reverse rotation permitted state and the rotor 103 is able to rotate in both directions. In addition, when the stopper cam shaft 161 is rotated in a reverse rotation prohibited direction (the clockwise direction of FIG. 15) by means of the stopper lever 162, the switching cam 163, as shown in FIG. 15, releases the pressing of the ratchet pawl 143 toward the switching projection 143d. The ratchet pawl 143 is then urged by means of the mesh direction urging member 150 and pivots toward the mesh position. As a result, the one way clutch 132 is placed in the reverse rotation prohibited state and reverse rotation in the line release direction of the rotor 103 is prohibited.

Third Embodiment

Figure 19:
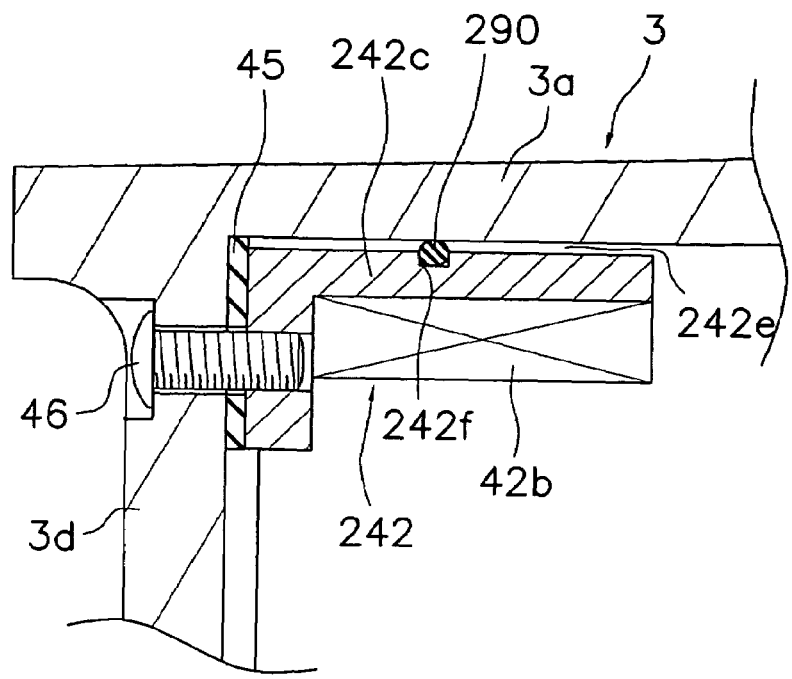
FIG. 19 is an enlarged cross-sectional view of a ratchet wheel of a one way clutch of the spinning reel illustrated in FIG. 1 in accordance with a third embodiment of the present invention.

Referring now to FIG. 19, a spinning reel in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The spinning reel of the third embodiment is essentially the same as in the first embodiment except a ring member 290, such as an O-ring, made of a resilient material is mounted in the gap 242e between the outer peripheral surface of the tubular portion 242c and the inner peripheral surface of the cylindrical portion 3a of the rotor 3. Preferably, an annular ring mounting groove 242f is formed in the outer peripheral surface of the tubular portion 242c. The ring member 290 is mounted in the ring mounting groove 242f. Because the ring member 290 is made out of a resilient material and is mounted in the gap 242e, vibrations can be further absorbed. It will be apparent to one of skill in the art from this disclosure that the ring member 290 may be any shape so long as it is a ring member made of a resilient material.

Fourth Embodiment

Figure 20:
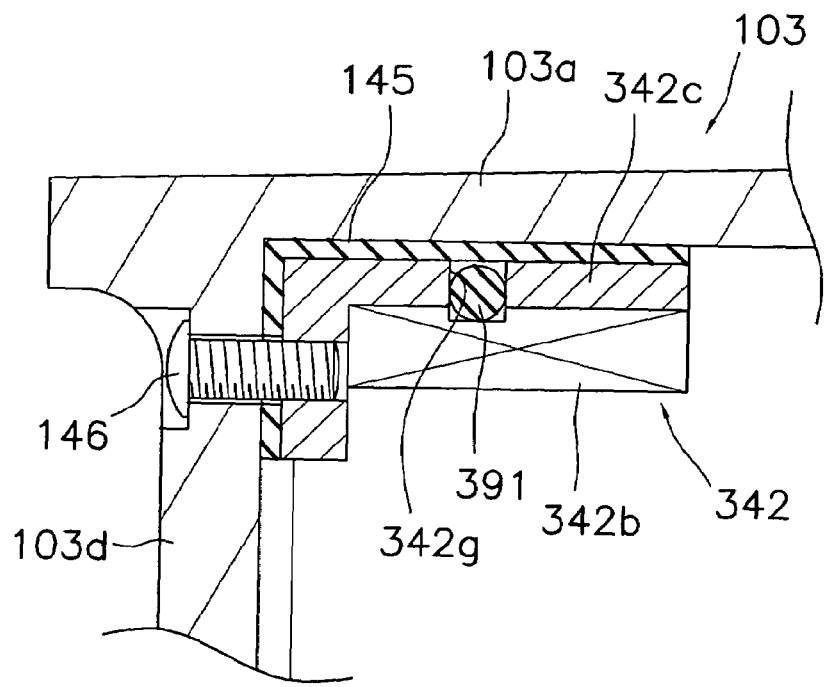
FIG. 20 is an enlarged cross-sectional view of a ratchet wheel of a one way clutch of the spinning reel illustrated in FIG. 14 in accordance with a fourth embodiment of the present invention.

Referring now to FIG. 20, a spinning reel in accordance with a fourth embodiment will now be explained. In view of the similarity between the second and fourth embodiments, the parts of the fourth embodiment that are identical to the parts of the second embodiment will be given the same reference numerals as the parts of the second embodiment. Moreover, the descriptions of the parts of the fourth embodiment that are identical to the parts of the second embodiment may be omitted for the sake of brevity.

The spinning reel of the fourth embodiment is essentially the same as in the second embodiment except that an annular ring mounting groove 342g is formed so that an outer diameter of the ratchet teeth 342b is smaller than a bottom diameter of the ring mounting groove 342g. A ring member 91, such as an O-ring, made of a resilient material is mounted in the ring mounting groove 342g. When the ratchet teeth 342b strike the ratchet pawl 143 during meshing, the ring member 391 will further reduce the impact from the strike. It will be apparent to one of skill in the art from this disclosure that the ring member 391 can be any shape with various diameters so long as it is a ring member made of a resilient material.

Fifth Embodiment

Figure 21:
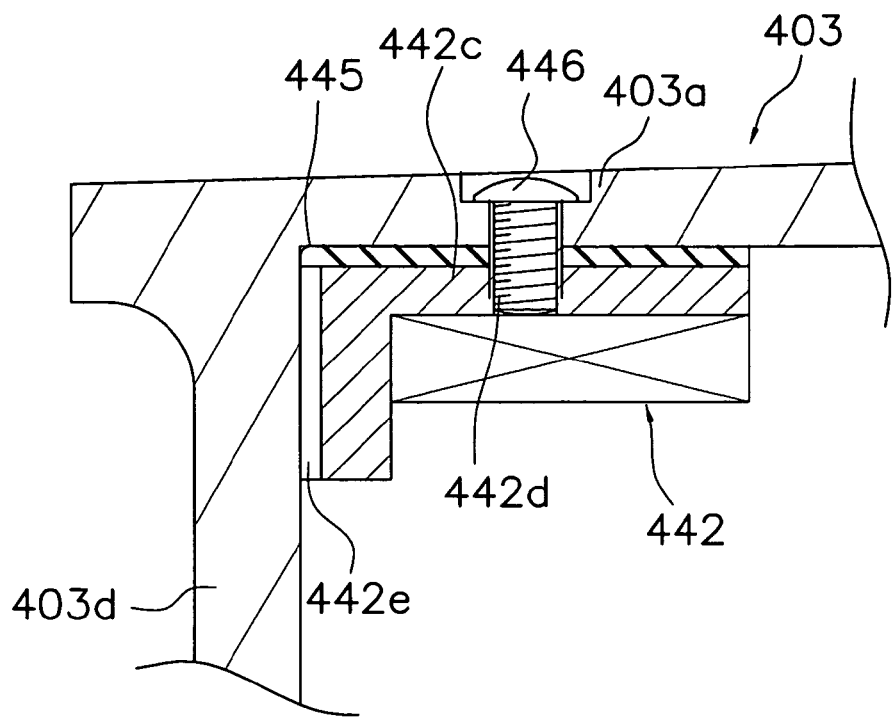
FIG. 21 is an enlarged cross-sectional view of a ratchet wheel of a one way clutch of the spinning reel illustrated in FIG. 1 in accordance with a fifth embodiment of the present invention.

Referring now to FIG. 21, a spinning reel in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the second embodiment may be omitted for the sake of brevity.

The spinning reel of the fifth embodiment is essentially the same as in the first embodiment except that a vibration absorption member 445 is between a cylindrical portion 403a of a rotor 403 and a wheel tubular portion 442c of a ratchet wheel 442. The cylindrical portion 403a, the vibration absorption member 445 and the wheel tubular portion 442c have inner threads running therethrough in the form of screw holes 442d. Installation screws 446 are screwed into the screw holes 442d to fix the ratchet wheel 442 to the cylindrical portion 403a. Preferably, four installation screws 446 are utilized. Accordingly, the ratchet wheel 442 and the vibration absorption member 445 are fixed to the cylindrical portion 403a by utilizing the installation screws 446. Preferably, a gap 442e is formed between a front wall 403d of the rotor 403 and the ratchet wheel 442.

Sixth Embodiment

Figure 22:
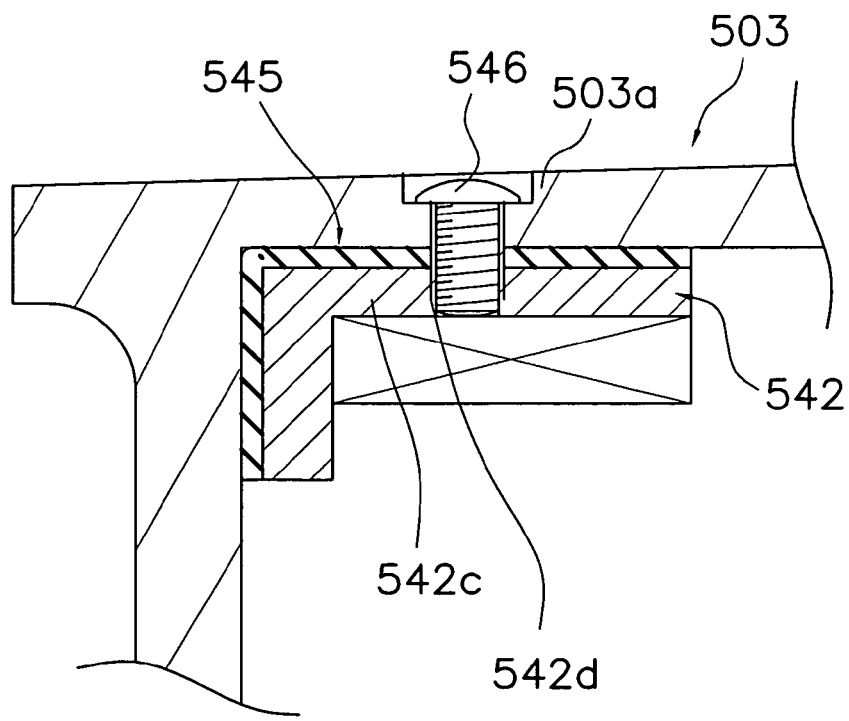
FIG. 22 is an enlarged cross-sectional view of a ratchet wheel of a one way clutch of the spinning reel illustrated in FIG. 14 in accordance with a sixth embodiment of the present invention.

Referring now to FIG. 22, a spinning reel in accordance with a sixth embodiment will now be explained. In view of the similarity between the second and sixth embodiments, the parts of the sixth embodiment that are identical to the parts of the second embodiment will be given the same reference numerals as the parts of the second embodiment. Moreover, the descriptions of the parts of the sixth embodiment that are identical to the parts of the second embodiment may be omitted for the sake of brevity.

The spinning reel of the sixth embodiment is essentially the same as in the second embodiment, except that a vibration absorption member 545 and a ratchet wheel 542 are attached to a cylindrical portion 503a of a rotor 503. The cylindrical portion 503a, the vibration absorption member 545 and a wheel tubular portion 542c of the ratchet wheel 542 have inner threads running therethrough in the form of screw holes 542d. Installation screws 546 are screwed into the screw holes 542d to fix the ratchet wheel 542 to the cylindrical portion 503a. Preferably, four installation screws 546 are utilized. Accordingly, the ratchet wheel 542 and the vibration absorption member 545 are fixed to the cylindrical portion 503a by utilizing the installation screws 546.

Seventh Embodiment

Figure 23:
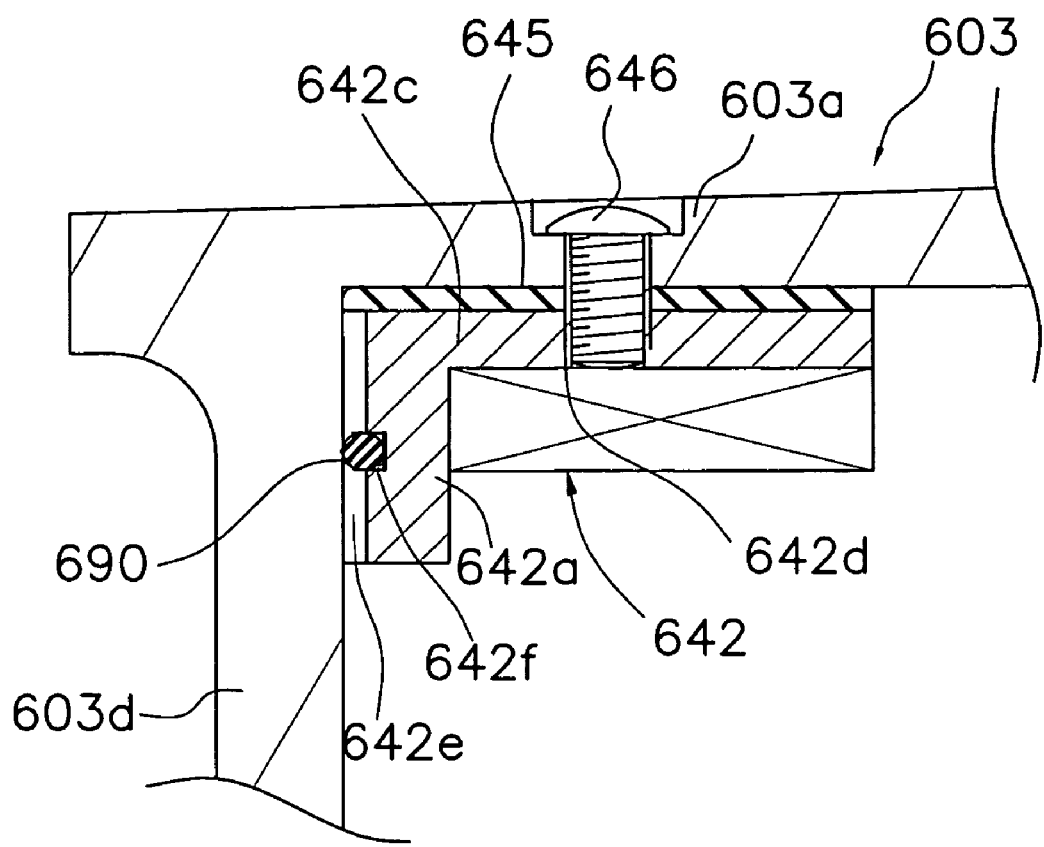
FIG. 23 is an enlarged cross-sectional view of a ratchet wheel of a one way clutch of the spinning reel illustrated in FIG. 1 in accordance with a seventh embodiment of the present invention.

Referring now to FIG. 23, a spinning reel in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The spinning reel of the seventh embodiment is essentially the same as in the first embodiment except that a vibration absorption member 645 is between a cylindrical portion 603a of a rotor 603 and a wheel tubular portion 642c of a ratchet wheel 642. The cylindrical portion 603a, the vibration absorption member 645 and the wheel tubular portion 642c have inner threads running therethrough in the form of screw holes 642d. The installation screws 46 are screwed into the screw holes 642d to fix the ratchet wheel 642 to the cylindrical portion 603a. Accordingly, the ratchet wheel 642 and the vibration absorption member 645 are fixed to the cylindrical portion 603a by utilizing the installation screws 46. Preferably, a gap 642e is formed between a front wall 603d of the rotor 403 and the ratchet wheel 642. In addition, an annular ring mounting groove 642f is formed in an outer peripheral surface of a wheel flange portion 642a of the ratchet wheel 642. A ring member 690 is mounted in the ring mounting groove 642f. Because the ring member 690 is made out of a resilient material and is mounted in the gap 642e, vibrations can be further absorbed. It will be apparent to one of skill in the art from this disclosure that the ring member 690 may be any shape so long as it is a ring member made of a resilient material.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A one way clutch arranged on a rotor rotatably mounted on a reel unit of a spinning reel, comprising:
   a ring shaped ratchet wheel fixed to the rotor and having a plurality of saw-tooth shaped ratchet teeth formed on an inner peripheral surface of the ratchet wheel;
   a ratchet pawl pivotally arranged between a mesh position in which the ratchet pawl meshes with the ratchet teeth and a mesh release position in which the ratchet pawl is separated from the ratchet teeth;
   an urging member that urges the ratchet pawl to at least the mesh position; and
   a vibration absorption member interposed between the ratchet wheel and the rotor, the rotor and either the reel unit or the reel component being linked only when the rotor rotates in a line-release direction.

2. The one way clutch according to claim 1, wherein the urging member is bi-directional such that the urging member urges the ratchet pawl to the mesh release position when the rotor rotates in the line winding direction and urges the ratchet pawl to the mesh position when the rotor reverse rotates in the line-release direction.

3. The one way clutch according to claim 1, wherein the urging member includes a mesh direction urging member that urges the ratchet pawl to the mesh position regardless of the rotation of the rotor.

4. The one way clutch according to claim 3, wherein the urging member further includes a mesh release direction urging member that urges the ratchet pawl to the mesh release position with an urging force that is stronger than that of the mesh direction urging member.

5. The one way clutch according to claim 1, wherein the rotor has a cylindrical portion and a front wall portion unitarily formed with an inner peripheral surface of the cylindrical portion;
the ratchet wheel is fixed to either the cylindrical portion or the front wall portion and is disposed across a gap from the other of the cylindrical portion and the front wall portion; and
the vibration absorption member is interposed between the ratchet wheel and either the cylindrical portion or the front wall portion.

6. The one way clutch according to claim 5, further comprising
a first ring member made of a resilient material disposed in the gap so as to be in contact with both the ratchet wheel and the other of the cylindrical portion and the front wall portion.

7. The one way clutch according to claim 1, wherein the rotor has a cylindrical portion and a front wall portion unitarily formed with an inner peripheral surface of the cylindrical portion;
the ratchet wheel is fixed to either the cylindrical portion or the front wall portion; and
the vibration absorption member is interposed between the ratchet wheel and the cylindrical portion and the front wall portion.

8. The one way clutch according to claim 1, wherein the ratchet wheel has an annular groove in an outer peripheral surface of the ratchet wheel, the annular groove having a bottom diameter that is smaller than an outer diameter of the ratchet teeth and a second ring member made of a resilient material mounted in the annular groove.

9. The one way clutch according to claim 1, wherein the ratchet pawl is disposed on the reel unit.

10. The one way clutch according to claim 1, wherein the ratchet pawl is disposed on a reel component that rotates with respect to the reel unit.

11. A spinning reel comprising:
a lever brake mechanism configured to brake a brake unit by means of a brake lever; and
a one way clutch including:
   a ring shaped ratchet wheel fixed to the rotor and having a plurality of saw-tooth shaped ratchet teeth formed on an inner peripheral surface of the ratchet wheel,
   a ratchet pawl coupled to the brake unit and pivotally arranged between a mesh position in which the ratchet pawl meshes with the ratchet teeth and a mesh release position in which the ratchet pawl is separated from the ratchet teeth,
   an urging member that urges the ratchet pawl to at least the mesh position, and
   a vibration absorption member interposed between the ratchet wheel and the rotor,
the one way clutch only transmitting rotation of the rotor to the brake unit when the rotor rotates in a line-release direction.

12. A spinning reel comprising:
a reverse rotation prevention mechanism having a one way clutch configured to prohibit reverse rotation of a rotor in a line-release direction,
the one way clutch including:
   a ring shaped ratchet wheel fixed to the rotor and having a plurality of saw-tooth shaped ratchet teeth formed on an inner peripheral surface of the ratchet wheel,
   a ratchet pawl disposed on the reel unit and pivotally arranged between a mesh position in which the ratchet pawl meshes with the ratchet teeth and a mesh release position in which the ratchet pawl is separated from the ratchet teeth,
   an urging member that urges the ratchet pawl to at least the mesh position, and
   a vibration absorption member interposed between the ratchet wheel and the rotor,
the rotor and the reel unit being linked only when the rotor rotates in the line-release direction.

* * * * *